US012054127B2

(12) United States Patent
Kimura et al.

(10) Patent No.: US 12,054,127 B2
(45) Date of Patent: Aug. 6, 2024

(54) BRAKE OPERATION UNIT

(71) Applicant: ADVICS CO., LTD., Kariya (JP)

(72) Inventors: Keisuke Kimura, Kariya (JP); Takashi Murayama, Kariya (JP)

(73) Assignee: ADVICS CO., LTD., Kariya (JP)

(*) Notice: Subject to any disclaimer, the term of this patent is extended or adjusted under 35 U.S.C. 154(b) by 649 days.

(21) Appl. No.: 17/289,265

(22) PCT Filed: Nov. 15, 2019

(86) PCT No.: PCT/JP2019/044817
§ 371 (c)(1),
(2) Date: Apr. 28, 2021

(87) PCT Pub. No.: WO2020/105550
PCT Pub. Date: May 28, 2020

(65) Prior Publication Data
US 2022/0055589 A1 Feb. 24, 2022

(30) Foreign Application Priority Data
Nov. 19, 2018 (JP) .................................. 2018-216898

(51) Int. Cl.
*B60T 17/00* (2006.01)
*B60T 7/04* (2006.01)
(Continued)

(52) U.S. Cl.
CPC ............... *B60T 11/16* (2013.01); *B60T 7/042* (2013.01); *B60T 13/146* (2013.01); *B60T 13/662* (2013.01); *B60T 8/4081* (2013.01)

(58) Field of Classification Search
CPC ........ B60T 11/16; B60T 7/042; B60T 13/146; B60T 13/662; B60T 8/4081
(Continued)

(56) References Cited

U.S. PATENT DOCUMENTS

| 9,446,753 B2* | 9/2016 | Feigel .................... B60T 13/66 |
| 2014/0216866 A1 | 8/2014 | Feigel et al. |
| 2016/0107629 A1* | 4/2016 | Han ......................... B60L 7/26 |
| | | 303/113.2 |

FOREIGN PATENT DOCUMENTS

| DE | 112016005339 T5 * | 8/2018 | ............. B60T 13/146 |
| JP | 2008213688 A * | 9/2008 | ............... B60T 13/74 |

(Continued)

OTHER PUBLICATIONS

International Search Report (PCT/ISA/210) with translation and Written Opinion (PCT/ISA/237) mailed on Jan. 28, 2020, by the Japanese Patent Office as the International Searching Authority for International Application No. PCT/JP2019/044817.

Primary Examiner — Christopher P Schwartz
(74) Attorney, Agent, or Firm — BUCHANAN INGERSOLL & ROONEY PC

(57) ABSTRACT

A brake operation unit includes, for example, a master cylinder that movably houses a piston moving in connection with an operation member; an electric discharging unit including a motor and a discharging mechanism that is caused to discharge a working fluid by operation of the motor; and a reaction force applying mechanism that applies a reaction force to the operation member. A second central axis of the motor is separated from a first central axis of the master cylinder, and intersects a direction parallel to the first central axis. When viewed in a direction parallel to the second central axis, the first central axis is located between the second central axis and the reaction force applying mechanism.

20 Claims, 8 Drawing Sheets

(51) Int. Cl.
*B60T 11/16* (2006.01)
*B60T 13/14* (2006.01)
*B60T 13/66* (2006.01)
*B60T 8/40* (2006.01)

(58) Field of Classification Search
USPC .... 303/10, 116.1, 116.4, 119.1, 119.2, 119.3
See application file for complete search history.

(56) References Cited

FOREIGN PATENT DOCUMENTS

| JP | 2016-068865 A | 5/2016 |
| JP | 6012731 B2 | 10/2016 |
| JP | 2017178107 A | 10/2017 |

* cited by examiner

BRAKE OPERATION UNIT

TECHNICAL FIELD

The present disclosure relates to a brake operation unit.

BACKGROUND ART

In the related art, a brake operation unit in which a plurality of components is integrated is known.

CITATION LIST

Patent Literature

PTL 1: Japanese Patent No. 6,012,731

SUMMARY

Technical Problem

It would be beneficial if the size of this type of brake operation unit can be further reduced in a radial direction of a central axis of a master cylinder.

Therefore, one of objects of the disclosure is to obtain, for example, a brake operation unit having a novel configuration with less inconvenience, of which the size can be further reduced in a radial direction of a central axis of a master cylinder.

Solution to Problem

According to an aspect of the disclosure, for example, there is provided a brake operation unit including: a master cylinder that movably houses a piston moving in connection with an operation member; an electric discharging unit including a motor and a discharging mechanism that is caused to discharge a working fluid by operation of the motor; and a reaction force applying mechanism that applies a reaction force to the operation member. A second central axis of the motor is separated from a first central axis of the master cylinder, and intersects a direction parallel to the first central axis. When viewed in a direction parallel to the second central axis, the first central axis is located between the second central axis and the reaction force applying mechanism.

According to the brake operation unit, the electric discharging unit and the reaction force applying mechanism can be disposed more compactly around the master cylinder. Accordingly, the size of the brake operation unit can be suppressed from being increased in a radial direction of the first central axis of the master cylinder.

DESCRIPTION OF EMBODIMENTS

Hereinafter, an exemplary embodiment of the disclosure will be disclosed. A configuration of the embodiment illustrated below, and actions and results (effects) by the configuration are one example. The disclosure can also be implemented by configurations other than the configuration disclosed in the following embodiment. In addition, according to the disclosure, at least one of various effects (including derivative effects) obtained by the configuration can be obtained. In addition, all the drawings are schematic and exemplary drawings.

[Symbols of Components and the Like and Subscripts at Ends of Symbols]

In the following description, components such as an "ECU", calculation processing, signals, characteristics, and values denoted by the same symbols have the same functions. Subscripts "i" to "l" affixed to the ends of various symbols are generic symbols indicating which wheel each symbol relates to. Specifically, "i" indicates a front right wheel, "j" indicates a front left wheel, "k" indicates a rear right wheel, and "l" indicates a rear left wheel. For example, in four wheel cylinders, a front right wheel cylinder is written as CWi, a front left wheel cylinder is written as CWj, a rear right wheel cylinder is written as CWk, and a rear left wheel cylinder is written as CWl. Further, the subscripts "i" to "l" at the ends of the symbols can be omitted. When the subscripts "i" to "l" are omitted, each symbol represents a generic term for four wheels. For example, "WH" represents each wheel, and "CW" represents each wheel cylinder.

Subscripts "f" and "r" affixed to the ends of various symbols are generic symbols indicating which system of the front and rear wheels each symbol relates to in two braking systems. Specifically, "f" indicates a front wheel system, and "r" indicates a rear wheel system. For example, in the wheel cylinder CW of each wheel, a front wheel cylinder is written as CWf (=CWi and CWj), and a rear wheel cylinder is written as CWr (=CWk and CWl). Further, the subscripts "f" and "r" at the ends of the systems can be omitted. When the subscripts "f" and "r" are omitted, each symbol represents a generic term for the two braking systems. For example, "CW" represents the wheel cylinders in the front and rear braking systems.

When the operation of a brake control device SC is in a proper state, braking performed by the brake control device SC is called "control braking". When the operation of the brake control device SC is in a malfunctioning state, braking by only the operating force of a driver is called "manual braking". Therefore, in the manual braking, the brake control device SC is not used.

[Entire Configuration and Function]

Figure 1:
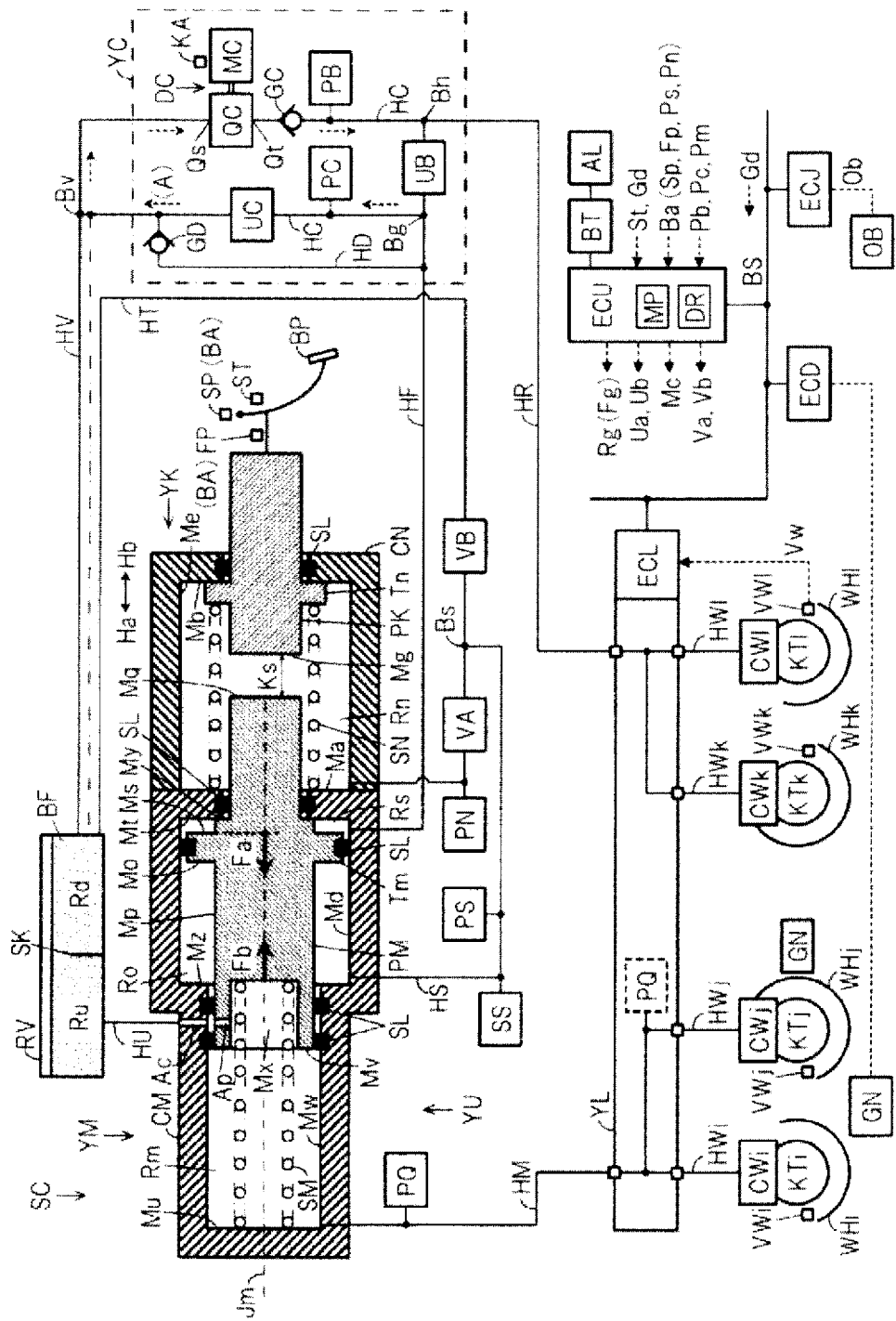
FIG. 1 is an exemplary entire configuration diagram of a brake control device of a vehicle including a brake operation unit of an embodiment.

The brake control device SC will be described with reference to an entire configuration diagram of FIG. 1. In general vehicles, a fluid path of two systems is adopted to secure redundancy. Here, the fluid path is a path through which a brake fluid BF that is a working fluid of the brake control device moves, and corresponds to brake pipes, flow paths of a fluid unit, hoses, and the like. The inside of the fluid path is filled with the brake fluid BF. In the brake control device SC, as the fluid path of the two systems, a so-called front-to-rear fluid path (also referred to as an "H type") is adopted. The front wheel system connected to front wheel cylinders CWi and CWj (also referred to as the "front wheel cylinder CWf") and the rear wheel system connected to rear wheel cylinders CWk and CWl (also referred to as the "rear wheel cylinder CWr") form the fluid path of the two systems. Incidentally, in the brake control device SC, the brake fluid BF is supplied from a reservoir RV to increase a hydraulic pressure Pw of the wheel cylinder CW. In the fluid path, a side close to the reservoir RV (side far from the wheel cylinder CW) is called an "upstream side" or an "upper portion", and a side close to the wheel cylinder CW (side far from the reservoir RV) is called a "downstream side" or a "lower portion".

A vehicle includes an electric motor GN for drive. Namely, the vehicle is a hybrid vehicle or an electric vehicle. The electric motor GN for drive functions as a generator for energy regeneration. For example, the generator GN is provided in a front wheel WHf. The electric motor/generator GN is driven by a drive controller ECD.

In addition, a distance sensor OB is provided in the vehicle to measure a distance (relative distance) Ob between an object (another vehicle, a fixed object, a person, a bicycle, or the like), which is present in front of the host vehicle, and the host vehicle. For example, a camera, radar, or the like is adopted as the distance sensor OB. The distance Ob is input to a driving assistance controller ECJ. In the driving assistance controller ECJ, a required deceleration Gd is calculated based on the relative distance Ob. The required deceleration Gd is the target value of a vehicle deceleration at which the vehicle is automatically braked instead of the driver without colliding with the object in front of the vehicle.

In the brake control device SC, so-called regenerative cooperation control (cooperation between regenerative braking and friction braking) is executed. The regenerative cooperation control is executed not only during braking by the driver but also during automatic braking by the driving assistance controller ECJ. The vehicle including the brake control device SC includes a brake operation member BP, the wheel cylinder CW, the reservoir RV, and a wheel speed sensor VW.

The brake operation member (for example, a brake pedal) BP is a member that is operated by the driver to decelerate the vehicle. When the brake operation member BP is operated, the braking torque of the wheel WH is regulated to generate a braking force F (generic term for front wheel and rear wheel braking forces Ff and Fr) in the wheel WH. Specifically, a rotary member (for example, a brake disc) KT is fixed to the wheel WH of the vehicle. Then, brake calipers are disposed to interpose the rotary member KT therebetween, and the wheel cylinder CW is provided there. When the pressure (brake hydraulic pressure) Pw of the brake fluid BF in the wheel cylinder CW is increased, friction members (for example, brake pads) are pressed against the rotary member KT. Since the rotary member KT and the wheel WH are fixed to each other to integrally rotate, braking torque (as a result, front wheel and rear wheel friction braking forces Fmf and Fmr) is generated in the wheel WH by a frictional force generated at this time.

The reservoir (atmospheric reservoir) RV is a tank for the working fluid, and the brake fluid BF is stored therein. A lower portion of the reservoir RV is partitioned off into a master reservoir chamber Ru connected to a master cylinder chamber Rm and a pressure regulating reservoir chamber Rd connected to a pressure regulating unit YC by a partition plate SK. In a state where the inside of the reservoir RV is filled with the brake fluid BF, the fluid level of the brake fluid BF is above the height of the partition plate SK. For this reason, the brake fluid BF can freely move between the master reservoir chamber Ru and the pressure regulating reservoir chamber Rd over the partition plate SK. On the other hand, when the amount of the brake fluid BF in the reservoir RV is reduced, and the fluid level of the brake fluid BF is lower than the height of the partition plate SK, the master reservoir chamber Ru and the pressure regulating reservoir chamber Rd become independent fluid reservoirs.

The wheel speed sensor VW is provided in each of the wheels WH to measure a wheel speed Vw. A signal for the wheel speed Vw is used for independent braking control of each wheel such as anti-skid control (control that suppresses an excessive deceleration slip of the wheel) and vehicle stabilization control (control that suppresses excessive oversteering and understeering behaviors). A vehicle body speed Vx is calculated based on each of the wheel speeds Vw measured by the wheel speed sensors VW.

[Brake Control Device SC]

The brake control device SC includes an upper portion fluid unit YU and a lower portion fluid unit YL. Here, the upper portion fluid unit YU is a fluid unit on a side close to a master cylinder CM, and the lower portion fluid unit YL is a fluid unit on a side close to the wheel cylinder CW. The inside of each of the fluid units YU and YL is liquid-tight by the brake fluid BF. The upper portion fluid unit YU is controlled by an upper portion controller ECU, and the lower portion fluid unit YL is controlled by a lower portion controller ECL. The upper portion controller ECU and the lower portion controller ECL are connected to each other via a communication bus BS to share each signal (a sensor measurement value, a calculated value, or the like).

The upper portion fluid unit YU of the brake control device SC includes an operation amount sensor BA, an operation switch ST, a stroke simulator SS, a master unit YM, the pressure regulating unit YC, and a regenerative cooperation unit YK.

The operation amount sensor BA is provided to measure an operation amount Ba of the brake operation member (brake pedal) BP generated by the driver. As the operation amount sensor BA, an operation displacement sensor SP which measures an operation displacement Sp of the brake operation member BP is provided. An operating force sensor FP is provided to measure an operating force Fp of the brake operation member BP. In addition, as the operation amount sensor BA, a simulator hydraulic pressure sensor PS is provided to measure a hydraulic pressure (simulator hydraulic pressure) Ps in the stroke simulator SS. An input hydraulic pressure sensor PN is provided to measure a hydraulic pressure (input hydraulic pressure) Pn in an input chamber Rn of the regenerative cooperation unit YK. The operation amount sensor BA is a generic term for the operation displacement sensor SP and the like, and at least one of the operation displacement Sp, the operating force Fp, the simulator hydraulic pressure Ps, and the input hydraulic pressure Pn is adopted as the brake operation amount Ba. The measured brake operation amount Ba is input to the upper portion controller ECU.

The operation switch ST is provided in the brake operation member BP to detect whether the brake operation member BP is operated by the driver. When the brake operation member BP is not operated (namely, during non-braking), the brake operation switch ST outputs an OFF signal as an operation signal St. On the other hand, when the brake operation member BP is operated (namely, during braking), an ON signal is output as the operation signal St. The brake operation signal St is input to the controller ECU.

The stroke simulator (simply also referred to as a "simulator") SS is provided to generate the operating force Fp in the brake operation member BP. A piston and an elastic body (for example, a compression spring) are provided inside the simulator SS. When the brake fluid BF moves into the simulator SS, the piston is pushed by the brake fluid BF flowing thereinto. Since the elastic body applies a force to the piston in a direction in which the inflow of the brake fluid BF is restrained, the operating force Fp when the brake operation member BP is operated is formed.

[Master Unit YM]

The master unit YM regulates a hydraulic pressure (front wheel brake hydraulic pressure) Pwf in the front wheel cylinder CWf via the master cylinder Rm. The master unit YM includes the master cylinder CM, a master piston PM, and a master elastic body SM.

The master cylinder CM is a cylinder member with a bottom portion. The master piston PM is a piston member inserted into the master cylinder CM, and is movable in connection with the operation of the brake operation member BP. The inside of the master cylinder CM is partitioned into three hydraulic chambers Rm, Rs, and Ro by the master piston PM.

Groove portions are formed in a first inner peripheral portion Mw of the master cylinder CM, and two seals SL are fitted into the groove portions. A gap between an outer peripheral portion (outer peripheral cylindrical surface) Mp of the master piston PM and the first inner peripheral portion (inner peripheral cylindrical surface) Mw of the master cylinder CM is sealed by the two seals SL. The master piston PM is smoothly movable along a central axis Jm of the master cylinder CM.

The master cylinder chamber (simply also referred to as a "master chamber") Rm is a hydraulic chamber that is partitioned off by "the first inner peripheral portion Mw and a first bottom portion (bottom surface) Mu of the master cylinder CM" and a first end portion My of the master piston PM. The master chamber Rm is connected to a master cylinder fluid path HM to be finally connected to the front wheel cylinder CWf via the lower portion fluid unit YL.

The master piston PM is provided with a flange Tm. The inside of the master cylinder CM is partitioned off into a servo hydraulic chamber (simply also referred to as a "servo chamber") Rs and a rear hydraulic chamber (simply also referred to as a "rear chamber") Ro by the flange Tm. An outer peripheral portion of the flange Tm is provided with the seal SL, and a gap between the flange Tm and a second inner peripheral portion Md of the master cylinder CM is sealed. The servo chamber Rs is a hydraulic chamber that is partitioned off by "the second inner peripheral portion Md and a second bottom portion (bottom surface) Mt of the master cylinder CM" and a first surface Ms of the flange Tm of the master piston PM. The master chamber Rm and the servo chamber Rs are disposed to face each other with the master piston PM (particularly, the flange Tm) interposed therebetween. A front wheel pressure regulating fluid path HF is connected to the servo chamber Rs, and a second regulated hydraulic pressure Pc is introduced thereto from the pressure regulating unit YC.

The rear chamber Ro is a hydraulic chamber that is partitioned off by the second inner peripheral portion Md of the master cylinder CM, a step portion Mz, and a second surface Mo of the flange Tm of the master piston PM. The rear chamber Ro is interposed between the master hydraulic chamber Rm and the servo hydraulic chamber Rs to be located therebetween in a direction of the central axis Jm. The rear chamber Ro is connected to a simulator fluid path HS. The flow rate of the brake fluid BF in the upper portion fluid unit YU is regulated by the rear chamber Ro.

The first end portion Mv of the master piston PM is provided with a recessed portion Mx. The master elastic body (for example, a compression spring) SM is provided between the recessed portion Mx and the first bottom portion Mu of the master cylinder CM. The master elastic body SM presses the master piston PM against the second bottom portion Mt of the master cylinder CM in the direction of the central axis Jm of the master cylinder CM. During non-braking, a step portion My of the master piston PM is in contact with the second bottom portion Mt of the master cylinder CM. The position of the master piston PM in this state is called the "initial position of the master unit YM".

The master cylinder CM is provided with a through-hole Ac between the two seals SL (for example, cup seals). The through-hole Ac is connected to the master reservoir chamber Ru via a supply fluid path HU. In addition, a through-hole Ap is provided in the vicinity of the first end portion Mv of the master piston PM. When the master piston PM is in the initial position, the master chamber Rm communicates with the reservoir RV (particularly, the master reservoir chamber Ru) via the through-holes Ac and Ap and the supply fluid path HU.

A biasing force Fb (referred to as a "retreating force") in a retreating direction Hb along the central axis Jm is applied to the master piston PM by an internal pressure (a "master cylinder hydraulic pressure" and also referred to as a "master hydraulic pressure") Pm of the master chamber Rm. A biasing force Fa (referred to as an "advancing force") facing the retreating force Fb is applied to the master piston PM by the internal pressure (namely, the introduced second regulated hydraulic pressure Pc) of the servo chamber Rs. Namely, in the master piston PM, the advancing force Fa by a hydraulic pressure Pv (=Pc) in the servo chamber Rs and the retreating force Fb by the hydraulic pressure (master hydraulic pressure) Pm in the master chamber Rm oppose (face) each other in the direction of the central axis Jm and are statically balanced. A master hydraulic pressure sensor PQ is provided to measure the master hydraulic pressure Pm. For example, the master hydraulic pressure sensor PQ can be provided in the master cylinder fluid path HM. In addition, the master hydraulic pressure sensor PQ may be included in the lower portion fluid unit YL.

For example, a pressure receiving area (namely, the pressure receiving area of the servo chamber Rs) rs of the first surface Ms of the flange Tm is set to be equal to a pressure receiving area (namely, the pressure receiving area of the master chamber Rm) rm of the first end portion My of the master piston PM. In this case, the hydraulic pressure Pc introduced into the servo chamber Rs (as a result, the servo hydraulic pressure Pv) and the hydraulic pressure Pm in the master chamber Rm are the same in a steady state. At this time, the advancing force Fa (=Pc×rs) and the retreating force Fb (=Pm×rm (+elastic force of SM)) are balanced.

[Pressure Regulating Unit YC]

A hydraulic pressure Pwf of the front wheel cylinder CWf and a hydraulic pressure Pwr of the rear wheel cylinder CWr are independently and individually regulated by the pressure regulating unit YC. Specifically, the brake hydraulic pressure Pwf of the front wheel WHf which is provided with the generator GN is regulated to be less than the brake hydraulic pressure Pwr of a rear wheel WHr which is not provided with the generator GN. The pressure regulating unit YC includes an electric pump DC, a one-way valve GC, first and second pressure regulating valves UB and UC, and first and second regulated hydraulic pressure sensors PB and PC.

The electric pump DC is formed of a set of one electric motor MC and one fluid pump QC. In the electric pump DC, the electric motor MC and the fluid pump QC are fixed to each other such that the electric motor MC and the fluid pump QC integrally rotate. The electric pump DC (particularly, the electric motor MC) is a power source that increases the brake hydraulic pressure Pw during control braking. The electric motor MC is controlled by the controller ECU.

For example, a three-phase brushless motor is adopted as the electric motor MC. The brushless motor MC is provided with a rotation angle sensor KA that detects a rotor position (rotation angle) Ka thereof. Switching elements of a bridge circuit are controlled based on the rotation angle (actual value) Ka, to drive the electric motor MC. Namely, directions of the energization amounts (namely, excitation directions) of coils of three phases (a U phase, a V phase, and a W phase) are sequentially switched to drive the brushless motor MC to rotate. A drive circuit DR is provided with an energization amount sensor that measures an actual energization amount $1a$ (generic term for each phase) of the electric motor MC. A current sensor is provided as the energization amount sensor to measure a supply current $1a$ to the electric motor MC.

A suction port Qs of the fluid pump QC is connected to the reservoir RV (particularly, the pressure regulating reservoir chamber Rd) via a first reservoir fluid path HV. A discharge port Qt of the fluid pump QC is connected to a pressure regulating fluid path HC. The brake fluid BF is suctioned from the first reservoir fluid path HV through the suction port Qs to be discharged from the discharge port Qt to the pressure regulating fluid path HC by driving of the electric pump DC (particularly, the fluid pump QC). For example, a gear pump is adopted as the fluid pump QC.

The one-way valve GC (also referred to as a "check valve") is installed in the pressure regulating fluid path HC. The one-way valve GC allows the brake fluid BF to move from the first reservoir fluid path HV toward the pressure regulating fluid path HC, but restrains the brake fluid BF from moving from the pressure regulating fluid path HC toward the first reservoir fluid path HV (namely, the backflow of the brake fluid BF). Namely, the electric pump DC rotates only in one direction. A portion By on an opposite side of the pressure regulating fluid path HC from the discharge portion Qt is connected to the first reservoir fluid path HV.

Two pressure regulating valves UB and UC are provided in series in the pressure regulating fluid path HC. Specifically, the first pressure regulating valve UB (corresponding to a "first electromagnetic valve") is provided in the pressure regulating fluid path HC. Then, the second pressure regulating valve UC (corresponding to a "second electromagnetic valve") is disposed between the first pressure regulating valve UB and the portion Bv. The first and second pressure regulating valves UB and UC are linear electromagnetic valves (also referred to as "proportional valves" or "differential pressure valves"), of which the valve opening amount (lift amount) is continuously controlled based on an energized state (for example, supply current). The first and second pressure regulating valves UB and UC are controlled by the controller ECU based on drive signals Ub and Uc. Normally open electromagnetic valves are adopted as the first and second pressure regulating valves UB and UC.

The brake fluid BF is pumped from the first reservoir fluid path HV through the suction port Qs of the fluid pump QC to be discharged from the discharge port Qt. Then, the brake fluid BF returns to the first reservoir fluid path HV through the one-way valve GC, the first pressure regulating valve UB, and the second pressure regulating valve UC. In other words, the first reservoir fluid path HV and the pressure regulating fluid path HC form a circulation path (fluid path through which the flow of the brake fluid BF returns to an original flow again), and the one-way valve GC and the first and second pressure regulating valves UB and UC are installed in series in the circulation path.

When the electric pump DC is operated, as illustrated by broken line arrows (A), the brake fluid BF circulates in order of "HV→QC (Qs→Qt)→GC→UB→UC→HV" (namely, the "circulation path" is formed). When the first and second pressure regulating valves UB and UC are in a fully open state (during non-energization since the first and second pressure regulating valves UB and UC are a normally open type), both hydraulic pressures (regulated hydraulic pressures) Pb and Pc in the pressure regulating fluid path HC are substantially "0 (atmospheric pressure)". When the energization amount applied to the first pressure regulating valve UB is increased to cause the pressure regulating valve UB to narrow the circulation path, the hydraulic pressure (first regulated hydraulic pressure, and corresponding to a "first hydraulic pressure") Pb between the fluid pump QC and the first pressure regulating valve UB in the pressure regulating fluid path HC is increased from "0". In addition, when the energization amount applied to the second pressure regulating valve UC is increased to cause the pressure regulating valve UC to narrow the circulation path, the hydraulic pressure (second regulated hydraulic pressure, and corresponding to a "second hydraulic pressure") Pc between the first pressure regulating valve UB and the second pressure regulating valve UC in the pressure regulating fluid path HC is increased from "0".

Since the first and second pressure regulating valves UB and UC are disposed in series in the pressure regulating fluid path HC, the second regulated hydraulic pressure Pc regulated by the second pressure regulating valve UC is the first regulated hydraulic pressure Pb or less. In other words, the second regulated hydraulic pressure Pc is regulated by the second pressure regulating valve UC to be increased from "0 (atmospheric pressure)", and the first regulated hydraulic pressure Pb is regulated by the first pressure regulating valve UB to be increased from the second regulated hydraulic pressure Pc. In the pressure regulating unit YC, the first and second regulated hydraulic pressure sensors PB and PC are provided in the pressure regulating fluid path HC to measure the first and second regulated hydraulic pressures Pb and Pc.

The pressure regulating fluid path HC branches to a rear wheel pressure regulating fluid path HR in a portion Bh between the fluid pump QC and the first pressure regulating valve UB. The rear wheel pressure regulating fluid path HR is connected to the rear wheel cylinder CWr (CWk and CWl) via the lower portion fluid unit YL. Therefore, the first regulated hydraulic pressure Pb regulated by the first pressure regulating valve UB is directly introduced (supplied) to the rear wheel cylinder CWr. In addition, the pressure regulating fluid path HC branches to a front wheel pressure regulating fluid path HF in a portion Bg between the first pressure regulating valve UB and the second pressure regulating valve UC. The front wheel pressure regulating fluid path HF is connected to the servo chamber Rs. Therefore, the second regulated hydraulic pressure Pc regulated by the second pressure regulating valve UC is introduced (supplied) to the servo chamber Rs. Since the master cylinder CM is connected to the front wheel cylinder CWf (CWi and CWj) via the lower portion fluid unit YL, the second regulated hydraulic pressure Pc is indirectly introduced to the front wheel cylinder CWf via the master cylinder CM. Namely, the second regulated hydraulic pressure Pc is supplied to the front wheel cylinder CWf in order of "Rs→Rm→CWf". The pressure regulating unit YC includes the two pressure regulating electromagnetic valves UB and UC, the pressure of the brake fluid BF discharged by the electric pump DC is regulated to the first regulated hydraulic pressure Pb by the first pressure regulating valve UB, and the first regulated hydraulic pressure Pb is introduced to the rear wheel cylinder CWr. Then, the first regulated hydraulic pressure Pb is regulated by the second pressure regulating valve UC to be reduced to the second regulated hydraulic pressure Pc, and the second regulated hydraulic pressure Pc is introduced to the servo chamber Rs.

In the pressure regulating unit YC, a bypass fluid path HD which connects the reservoir RV and the servo chamber Rs is provided in parallel to the pressure regulating fluid path HC. A one-way valve GD is installed in the fluid path HD. The one-way valve GD allows the flow of the brake fluid BF from the reservoir RV to the servo chamber Rs, but restrains a flow from the servo chamber Rs to the reservoir RV. When the brake operation member BP is suddenly operated, the master piston PM can also be moved in an advancing direction Ha by the operating force of the driver to increase the volume of the servo chamber Rs. In this case, the flow rate corresponding to an increase in volume of the servo chamber Rs caused by the operation by the driver is supplied via the bypass fluid path HD and the one-way valve GD. Since the amount of the brake fluid BF supplied by the electric pump DC is efficiently used to increase the brake hydraulic pressure Pw, the boosting response during sudden braking can be improved.

[Regenerative Cooperation Unit YK]

The regenerative cooperation unit YK achieves cooperation control (referred to as "regenerative cooperation control") of the friction braking and the regenerative braking. Namely, the brake operation member BP is operated by the regenerative cooperation unit YK, but a state where the brake hydraulic pressure Pw is not generated can be formed. The regenerative cooperation unit YK includes an input cylinder CN, an input piston PK, an input elastic body SN, a first opening and closing valve VA, a second opening and closing valve VB, the stroke simulator SS, the simulator hydraulic pressure sensor PS, and the input hydraulic pressure sensor PN.

The input cylinder CN is a cylinder member with a bottom portion, which is fixed to the master cylinder CM. The input piston PK is a piston member inserted into the input cylinder CN. The input piston PK is mechanically connected to the brake operation member BP via a clevis (U-shaped ring) to move in connection with the brake operation member BP. The input piston PK is provided with a flange Tn. The input elastic body (for example, a compression spring) SN is provided between an attachment surface Ma of the input cylinder CN to the master cylinder CM and the flange Tn of the input piston PK. The input elastic body SN presses the flange Tn of the input piston PK against a bottom portion Mb of the input cylinder CN in the direction of the central axis Jm.

During non-braking, the step portion My of the master piston PM is in contact with the second bottom portion Mt of the master cylinder CM, and the flange Tn of the input piston PK is in contact with the bottom portion Mb of the input cylinder CN. During non-braking, in the input cylinder CN, a gap Ks between the master piston PM (particularly, an end surface Mq) and the input piston PK (particularly, an end surface Mg) is set to a predetermined distance ks (referred to as an "initial gap"). Namely, when the pistons PM and PK are in positions farthest (referred to as the "initial positions" of the pistons) in the retreating direction Hb (namely, during non-braking), the master piston PM and the input piston PK are separated from each other by the predetermined distance ks. Here, the predetermined distance ks corresponds to the maximum value of a regenerative amount Rg. When the regenerative cooperation control is executed, the gap (also referred to as a "separation displacement") Ks is controlled (regulated) by the regulated hydraulic pressure Pc.

When the brake operation member BP is stepped on from the state of "Ba=0", the input piston PK moves from the initial position in the advancing direction Ha. At this time, when the second regulated hydraulic pressure Pc remains "0", the master piston PM remains in the initial position, and as the input piston PK advances, the gap Ks (distance between the end surface Mg of the input piston PK and the end surface Mq of the master piston PM) is gradually reduced. On the other hand, when the second regulated hydraulic pressure Pc is increased from "0", the master piston PM moves from the initial position in the advancing direction Ha. For this reason, the gap Ks can be regulated in a range of "$0 \leq Ks \leq ks$" independently from the brake operation amount Ba by the second regulated hydraulic pressure Pc. Namely, when the second regulated hydraulic pressure Pc is regulated, the gap Ks is regulated, so that the regenerative cooperation control is achieved.

The input cylinder CN is connected to the reservoir RV (particularly, the pressure regulating reservoir chamber Rd) via a second reservoir fluid path HT. A part of the second reservoir fluid path HT can be shared with the first reservoir fluid path HV. However, it is desirable that the first reservoir fluid path HV and the second reservoir fluid path HT are separately connected to the reservoir RV. The fluid pump QC suctions the brake fluid BF from the reservoir RV via the first reservoir fluid path HV, and at this time, bubbles may be mixed in the first reservoir fluid path HV. For this reason, the second reservoir fluid path HT is connected to the reservoir RV separately from the first reservoir fluid path HV without including a portion common with the first reservoir fluid path HV, such that the bubbles are avoided from being mixed in the input cylinder CN and the like.

Two opening and closing valves VA and VB are provided in series in the second reservoir fluid path HT. The first and second opening and closing valves VA and VB are two-position electromagnetic valves (also referred to as "on and off valves") having an open position (communication state) and a closed position (shutoff state). The first and second opening and closing valves VA and VB are controlled by the upper portion controller ECU based on drive signals Va and Vb. A normally closed electromagnetic valve and a normally open electromagnetic valve are adopted as the first opening and closing valve VA and the second opening and closing valve VB, respectively.

The second reservoir fluid path HT is connected to the simulator fluid path HS at a connection portion Bs between the first opening and closing valve VA and the second opening and closing valve VB. In other words, one end of the simulator fluid path HS is connected to the rear chamber Ro, and the other end of the simulator fluid path HS is connected to the connection portion Bs. The simulator fluid path HS is provided with the stroke simulator SS. When the regenerative cooperation control is executed by the simulator SS to cause the first opening and closing valve VA and the second opening and closing valve VB to be located in the open position and the closed position, respectively, the operating force Fp of the brake operation member BP is generated. The piston and the elastic body (for example, a compression spring) are provided inside the simulator SS. The brake fluid BF moves from the input cylinder CN to the simulator SS, and the piston is pushed by the brake fluid BF flowing thereinto. The elastic body applies a force to the piston in the direction in which the inflow of the brake fluid BF is restrained. The operating force Fp when the brake operation member BP is operated is formed by the elastic body.

The simulator hydraulic pressure sensor PS is provided in the simulator fluid path HS to measure the hydraulic pressure (simulator hydraulic pressure) Ps in the simulator SS. In addition, the input hydraulic pressure sensor PN is provided to measure the hydraulic pressure (hydraulic pressure of the input chamber Rn, and referred to as the "input hydraulic pressure") Pn between the first opening and closing valve VA of the second reservoir fluid path HT and the input chamber Rn. Each of the simulator hydraulic pressure sensor PS and the input hydraulic pressure sensor PN is one of the brake operation amount sensors BA described above. The measured hydraulic pressures Ps and Pn are input to the upper portion controller ECU, as the brake operation amounts Ba.

[Upper Portion Controller ECU]

The upper portion controller ECU controls the electric motor MC and the electromagnetic valves VA, VB, UB, and UC based on the brake operation amount Ba, the operation signal St, and the first and second regulated hydraulic pressures (measured values) Pb and Pc. Specifically, the upper portion controller ECU calculates the drive signals Va, Vb, Ub, and Uc to control the various electromagnetic valves VA, VB, UB, and UC. Similarly, a drive signal Mc for controlling the electric motor MC is calculated. Then, the electromagnetic valves VA, VB, UB, and UC and the electric motor MC are driven based on the drive signals Va, Vb, Ua, Ub, and Mc.

The upper portion controller (electronic control unit) ECU is network connected to the lower portion controller ECL and the controllers of other systems (the drive controller ECD, the driving assistance controller ECJ, and the like) via the onboard communication bus BS. The regenerative amount (target value) Rg is transmitted from the upper portion controller ECU to the drive controller ECD through the communication bus BS such that the regenerative cooperation control is executed. In addition, the required deceleration (target value) Gd is transmitted from the driving assistance controller ECJ to the upper portion controller ECU through the communication bus BS.

[Lower Portion Fluid Unit YL]

The lower portion fluid unit YL is a well-known fluid unit including the master hydraulic pressure sensor PQ, a plurality of electromagnetic valves, an electric pump, and a low-pressure reservoir. The lower portion fluid unit YL is controlled by the lower portion controller ECL. The wheel speed Vw, a yaw rate, a steering angle, a longitudinal acceleration, a lateral acceleration, and the like are input to the ECL. The lower portion controller ECL calculates the vehicle body speed Vx based on the wheel speed Vw. Then, based on the vehicle body speed Vx and the wheel speed Vw, the anti-skid control is executed such that an excessive deceleration slip of the wheel WH (for example, wheel lock) is suppressed. In addition, the lower portion controller ECL performs the vehicle stabilization control (so-called ESC) which suppresses an unstable behavior (excessive oversteering behavior or understeering behavior) of the vehicle, based on the yaw rate. Namely, the brake hydraulic pressure Pw of each of the wheels WH is individually controlled by the lower portion fluid unit YL. Incidentally, the vehicle body speed Vx which is calculated is input to the upper portion controller ECU through the communication bus BS.

[Operation of Brake Control Device SC]

During non-braking (for example, when the brake operation member BP is not operated), the electromagnetic valves VA, VB, UB, and UC are not energized. For this reason, the first opening and closing valve VA is in the closed position, and the second opening and closing valve VB is in the open position. At this time, the pistons PM and PN are pressed to the initial positions by the elastic bodies SM and SN, the master cylinder CM and the reservoir RV are in a communication state, and the master hydraulic pressure Pm is "0 (atmospheric pressure)".

When the brake operation member BP is operated (particularly, when the control braking is started), the first opening and closing valve VA is in the open position, so that the input chamber Rn and the rear chamber Ro are connected to each other, and the simulator SS is connected to the input chamber Rn. In addition, since the second opening and closing valve VB is in the closed position, connection between the simulator SS and the reservoir RV is shutoff. The input piston PK is moved in the advancing direction Ha by the operation of the brake operation member BP, the flow rate flowing out from the input chamber Rn due to the movement flows into the simulator SS, and the operating force Fp of the brake operation member BP is formed.

When a regenerative braking force Fg by the generator GN is sufficient to decelerate the vehicle, the state of "Pb=Pc=0" is maintained. The input piston PK is moved from the initial position in the advancing direction Ha by the operation of the brake operation member BP, but at this time, since the second regulated hydraulic pressure Pc remains "0", the master piston PM does not move. Therefore, as the input piston PK advances, the gap Ks (distance between the end surface Mg of the input piston PK and the end surface Mq of the master piston PM) is gradually reduced.

When the regenerative braking force Fg by the generator GN is insufficient to decelerate the vehicle, the pressure regulating unit YC is controlled by the controller ECU, so that the first and second regulated hydraulic pressures Pb and Pc are regulated. The first regulated hydraulic pressure Pb is directly applied to the rear wheel cylinder CWr through the rear wheel pressure regulating fluid path HR and the lower portion fluid unit YL. The second regulated hydraulic pressure Pc is applied to the servo chamber Rs through the front wheel pressure regulating fluid path HF. When the force (advancing force) Fa in the advancing direction Ha generated by the hydraulic pressure (servo hydraulic pressure) Pv (=Pc) in the servo chamber Rs is larger than the set load of the master elastic body SM, the master piston PM moves along the central axis Jm. The master chamber Rm is shut off from the reservoir RV by the movement in the advancing direction Ha. Further, when the second regulated hydraulic pressure Pc is increased, the brake fluid BF is pressure fed from the master cylinder CM toward the front wheel cylinder CWf at the master hydraulic pressure Pm. The master hydraulic pressure Pm causes the force (retreating force) Fb in the retreating direction Hb to act on the master piston PM. In the servo chamber Rs, the force (advancing force) Fa in the advancing direction Ha is generated by the second regulated hydraulic pressure Pc to oppose (face) the retreating force Fb. The master hydraulic pressure Pm is increased or decreased according to an increase or a decrease in the regulated hydraulic pressure Pc.

As the second regulated hydraulic pressure Pc is increased, the master piston PM moves from the initial position in the advancing direction Ha, but the gap Ks can be regulated in a range of "0≤Ks≤ks" independently from the brake operation amount Baby the second regulated hydraulic pressure Pc. Namely, the regenerative cooperation control is executed by the regulation of the gap Ks by the second regulated hydraulic pressure Pc.

When the brake operation member BP returns, the second regulated hydraulic pressure Pc is reduced by the pressure regulating unit YC. Then, when the servo hydraulic pressure Pv (=Pc) is smaller than the hydraulic pressure Pm (=Pwf) in the master chamber, the master piston PM moves in the retreating direction Hb. When the brake operation member BP is in a non-operation state, the elastic force of the compression spring SM causes the master piston PM (particularly, the step portion My) to return to a position (initial position) where the master piston PM is in contact with the second bottom portion Mt of the master cylinder CM.

Incidentally, during the manual braking, the first and second opening and closing valves VA and VB are not energized. Therefore, the first opening and closing valve VA is in the closed position, and the second opening and closing valve VB is in the open position. Since the first opening and closing valve VA is in the closed position, the input chamber Rn is in a state of fluid lock (sealed state), so that the input piston PK and the master piston PM cannot move relative to each other. In addition, since the second opening and closing valve VB is in the open position, the rear chamber Ro is fluid-connected to the reservoir RV through the second reservoir fluid path HT. For this reason, the volume of the rear chamber Ro is reduced by movement of the master piston PM in the advancing direction Ha, but the flow rate due to the reduction in volume is discharged toward the reservoir RV. The input piston PK and the master piston PM integrally move in connection with the operation of the brake operation member BP, and the brake fluid BF is pressure fed from the master chamber Rm to the front wheel cylinder CWf.

[Pressure Regulating Control Process]

Figure 2:
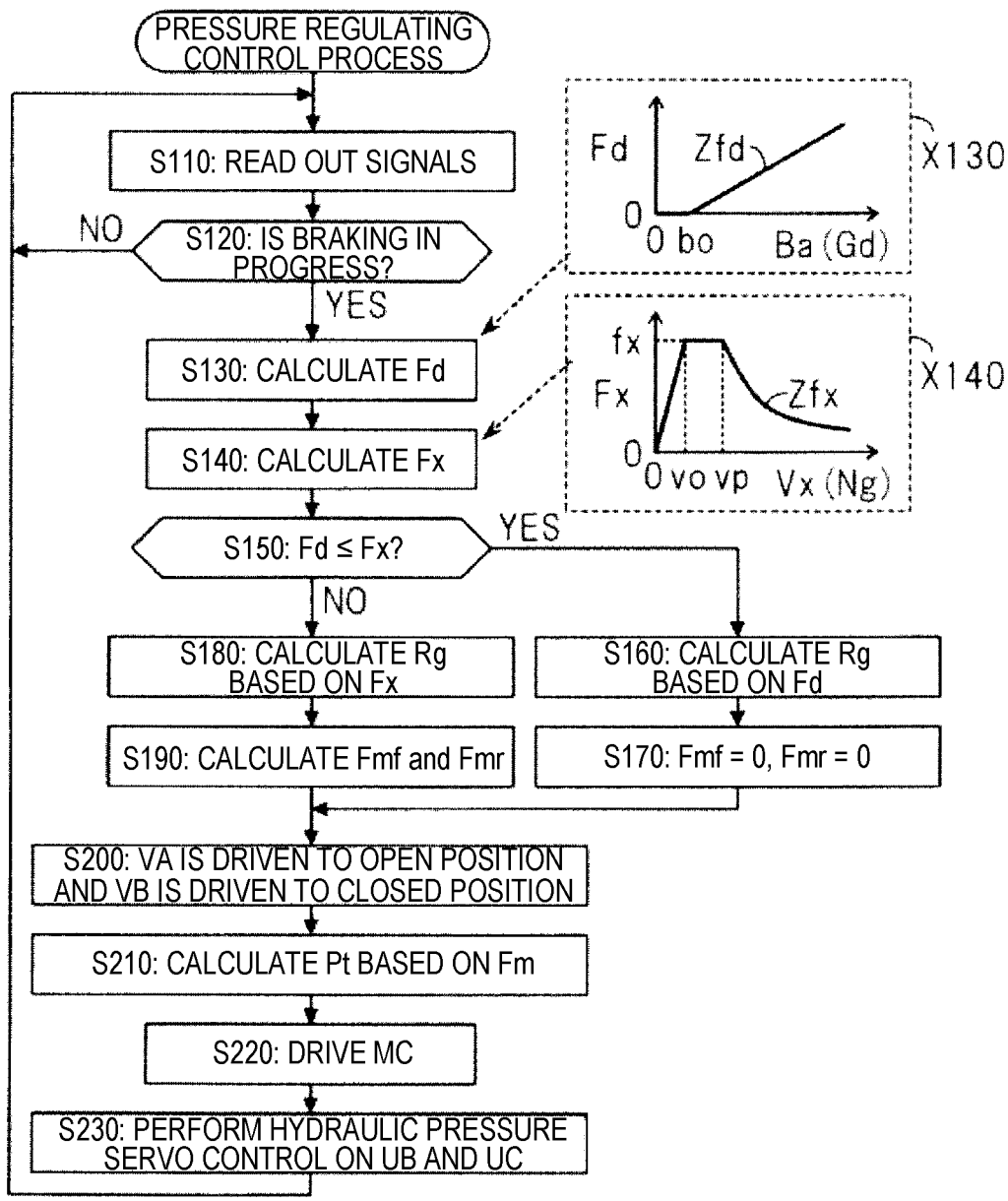
FIG. 2 is an exemplary flowchart illustrating a pressure regulating control process including a regenerative cooperation control in the embodiment.

A pressure regulating control process including the regenerative cooperation control will be described with reference to the control flowchart of FIG. 2. The "pressure regulating control" is control of driving the electric motor MC and the first and second pressure regulating valves UB and UC to regulate the first and second regulated hydraulic pressures Pb and Pc. An algorithm of the control is programmed in the upper portion controller ECU.

In step S110, the brake operation amount Ba, the operation signal St, the first and second regulated hydraulic pressures (measured values) Pb and Pc, the required deceleration Gd, and the vehicle body speed Vx are read out. The operation amount Ba is measured by the operation amount sensors BA (the operation displacement sensor SP, the input hydraulic pressure sensor PN, the simulator hydraulic pressure sensor PS, and the like). The operation signal St is detected by the operation switch ST. The first and second regulated hydraulic pressures Pb and Pc are measured by the first and second regulated hydraulic pressure sensors PB and PC provided in the pressure regulating fluid path HC. The required deceleration Gd by automatic braking is acquired from the driving assistance controller ECJ via the communication bus BS. The vehicle body speed Vx is acquired from the lower portion controller ECL via the communication bus BS. Incidentally, the wheel speed Vw may be input to the upper portion controller ECU, and the upper portion controller ECU may calculate the vehicle body speed Vx based on the wheel speed Vw.

In step S120, "whether or not braking is in progress" is determined based on at least one of the brake operation amount Ba and the brake operation signal St. For example, when the operation amount Ba is larger than a predetermined value bo, the determination result in step S120 is Yes, and the process proceeds to step S130. On the other hand, when the brake operation amount Ba is the predetermined value bo or less, the determination result in step S120 is No, and the process returns to step S110. Here, the predetermined value bo is a constant that is set in advance and corresponds to the play of the brake operation member BP. In addition, when the operation signal St is ON, the process proceeds to step S130, and when the operation signal St is OFF, the process returns to step S110.

During automatic braking, in step S120, based on the required deceleration Gd, it is determined "whether or not braking is in progress". For example, when the required deceleration Gd is larger than a predetermined value go, the determination result in step S120 is Yes, and the process proceeds to step S130. On the other hand, when the required deceleration Gd is the predetermined value go or less, the determination result in step S120 is No, and the process returns to step S110. The predetermined value go is a constant (for example, "0") set in advance.

In step S130, as illustrated in a block X130, a required braking force Fd is calculated based on the operation amount Ba. The required braking force Fd is the target value of the total braking force F acting on the vehicle, and is a braking force that is a combination of a "friction braking force Fm by the brake control device SC" and the "regenerative braking force Fg by the generator GN". According to a calculation map Zfd, when the operation amount Ba is in a range of "0" to the predetermined value bo, the required braking force Fd is determined to be "0", and when the operation amount Ba is the predetermined value bo or more, the required braking force Fd is calculated to monotonically to increase from "0" as the operation amount Ba is increased. Similarly, during automatic braking, the required braking force Fd is calculated based on the required deceleration Gd. When the required deceleration Gd is "0" or more and less than the predetermined value go, the required braking force Fd is determined to be "0", and when the required deceleration Gd is the predetermined value bo or more, the required braking force Fd is determined to monotonically increase from "0" according to an increase in the required deceleration Gd.

In step S140, as illustrated in a block X140, a maximum value Fx of the regenerative braking force (referred to as a "maximum regenerative force") is calculated based on the vehicle body speed Vx and a calculation map Zfx. The regenerative amount of the generator GN is limited by the rating of a power transistor (IGBT or the like) of the drive controller ECD, and the charge acceptability of a battery. For example, the regenerative amount of the generator GN is controlled to a predetermined electric power (electrical energy per unit time). Since the electric power (power) is constant, the regenerative torque around a wheel shaft by the generator GN is inversely proportional to the rotational frequency of the wheel WH (namely, the vehicle body speed Vx). In addition, when a rotational frequency Ng of the generator GN decreases, the regenerative amount is reduced. Further, an upper limit value is set for the regenerative amount.

As described above, in the calculation map Zfx for the maximum regenerative force Fx, in a range where the vehicle body speed Vx is "0" or more and less than a first predetermined speed vo, as the vehicle body speed Vx increases, the maximum regenerative force Fx is set to increase. In addition, in a range where the vehicle body speed Vx is the first predetermined speed vo or more and less than a second predetermined speed vp, the maximum regenerative force Fx is determined to be an upper limit value fx. Then, in a range where the vehicle body speed Vx is the second predetermined speed vp or more, the maximum regenerative force Fx is set to reduce as the vehicle body speed Vx increases. For example, in a reduction characteristic of the maximum regenerative force Fx (characteristic of "Vx≥vp"), the relationship between the vehicle body speed Vx and the maximum regenerative force Fx is represented by a hyperbola (namely, the regenerative electric power is constant). Here, the predetermined values vo and vp are constants set in advance. Incidentally, in the calculation map Zfx, instead of the vehicle body speed Vx, the rotational frequency Ng of the generator GN can be adopted.

In step S150, based on the required braking force Fd and the maximum regenerative force Fx, it is determined "whether or not the required braking force Fd is the maximum regenerative force Fx or less". Namely, it is determined whether or not the braking force F required by the driver can be achieved only by the regenerative braking force Fg. When "Fd≤Fx" is established, and the determination result in step S150 is Yes, the process proceeds to step S160. On the other hand, when "Fd>Fx" is established, and the determination result in step S150 is No, the process proceeds to step S180.

In step S160, the regenerative amount Rg is calculated based on the required braking force Fd. The regenerative amount Rg is the target value of the regenerative amount of the generator GN. The regenerative amount Rg is transmitted from the upper portion controller ECU to the drive controller ECD via the communication bus BS. In step S170, the front and rear wheel target friction braking forces Fmf and Fmr are calculated to be "0". In this case, in decelerating the vehicle, the friction braking is not adopted, and the required braking force Fd is achieved only by the regenerative braking.

In step S180, the regenerative amount (target value) Rg is calculated based on the maximum regenerative force Fx. Similar to step S160, the regenerative amount Rg is transmitted to the drive controller ECD via the communication bus BS. In this case, the maximum regenerative braking force which can be generated is generated by the generator GN. In step S190, the front wheel and rear wheel friction braking forces Fmf and Fmr are determined based on the required braking force Fd and the maximum regenerative force Fx. The front wheel and rear wheel friction braking forces Fmf and Fmr are the target values of the braking forces to be achieved by the friction braking.

In step S190, first, the required braking force Fd is multiplied by a rear wheel ratio Hr to calculate a rear wheel reference force Fs (namely, "Fs=Hr×Fd"). The rear wheel ratio Hr represents a distribution ratio between the front and rear wheels (particularly, the ratio of the rear wheel braking force Fr to the total braking force F acting on the vehicle), and is a predetermined value set in advance. Therefore, the rear wheel reference force Fs is a value in which the braking force distribution between the front and rear wheels with respect to the required braking force Fd is taken into consideration. In addition, the maximum regenerative force Fx is subtracted from the required braking force Fd to calculate a complementary braking force Fh (namely, "Fh=Fd−Fx"). The complementary braking force Fh is a braking force that is to be complemented by the friction braking to achieve the required braking force Fd. Then, the complementary braking force Fh and the rear wheel reference force Fs are compared to each other. When the complementary braking force Fh is the rear wheel reference force Fs or less, the front wheel friction braking force Fmf and the rear wheel friction braking force Fmr are determined to be "0" and the complementary braking force Fh, respectively (namely, "Fmf=0 and Fmr=Fh"). On the other hand, when the complementary braking force Fh is larger than the rear wheel reference force Fs, the rear wheel friction braking force Fmr is calculated to be the rear wheel reference force Fs, and the front wheel friction braking force Fmf is calculated to be a value (front wheel indicated force) Fc obtained by subtracting the rear wheel reference force Fs from the complementary braking force Fh (namely, "Fmf=Fc=Fh−Fs and Fmr=Fs=Hr×Fd").

In step S190, the front wheel and rear wheel friction braking forces Fmf and Fmr are calculated in consideration of the front-to-rear distribution of the braking force F including the regenerative braking force Fg. When the required braking force Fd can be achieved by the regenerative braking force Fg and the rear wheel reference force Fs (rear wheel braking force in which the front-to-rear distribution is taken into consideration) (namely, in the case of "Fh≤Fs"), the front wheel friction braking force Fmf remains "0", and only the regenerative braking force Fg (=Fx) acts on the front wheel WHf. Regarding the rear wheel WHr, the rear wheel friction braking force Fmr is determined and added to satisfy the required braking force Fd. On the other hand, when the required braking force Fd cannot be achieved by the regenerative braking force Fg and the rear wheel reference force Fs (namely, in the case of "Fh>Fs"), the front wheel friction braking force Fmf is determined to fill the shortage. Accordingly, the regenerative amount Rg can be maximized, and the front-to-rear distribution of the braking force F can be optimized.

In step S200, the first opening and closing valve VA and the second opening and closing valve VB are driven to the open position and the closed position, respectively. In step S210, a target hydraulic pressure Pt (Ptf and Ptr) is calculated based on the target value Fm (Fmf and Fmr) of the friction braking force. Namely, the friction braking force Fm is converted into a hydraulic pressure to determine the target hydraulic pressure Pt. A rear wheel target hydraulic pressure Ptr is the target value of the hydraulic pressure of the rear wheel cylinder CWr corresponding to the first regulated hydraulic pressure Pb. In addition, a front wheel target hydraulic pressure Ptf is the target value of the hydraulic pressure of the front wheel cylinder CWf corresponding to the second regulated hydraulic pressure Pc.

In step S220, the electric motor MC is driven to form a circulation of the brake fluid BF including the fluid pump QC. Incidentally, even in the case of "Ptf=Ptr=0", in order to secure the boosting response, the electric motor MC (electric pump DC) is driven (rotates). Then, in step S230, based on the rear wheel target hydraulic pressure Ptr and the first regulated hydraulic pressure Pb (measured value of the first regulated hydraulic pressure sensor PB), the first pressure regulating valve UB is servo-controlled such that the first regulated hydraulic pressure Pb coincides with the rear wheel target hydraulic pressure Ptr. In addition, based on the front wheel target hydraulic pressure Ptf and the second regulated hydraulic pressure Pc (measured value of the second regulated hydraulic pressure sensor PC), the second pressure regulating valve UC is servo controlled such that the second regulated hydraulic pressure Pc coincides with the front wheel target hydraulic pressure Ptf. In the servo control, the actual values Pb and Pc are feedback controlled to coincide with the target value Pt.

The first and second pressure regulating valves UB and UC are disposed in series in the pressure regulating fluid path HC. For this reason, in the hydraulic pressure feedback control of the first and second regulated hydraulic pressures Pb and Pc, first and second regulated hydraulic pressures Pb and Pc affect each other, so that so-called control interference may occur. In such a case, the control of the second regulated hydraulic pressure Pc related to the front wheel WHf takes precedence over the control of the first regulated hydraulic pressure Pb related to the rear wheel WHr. The precedence is based on the fact that the front wheel braking force Ff has a higher contribution to the total braking force F than the rear wheel braking force Fr.

[Transition of Front-to-Rear Distribution of Braking Force]

Figure 3:
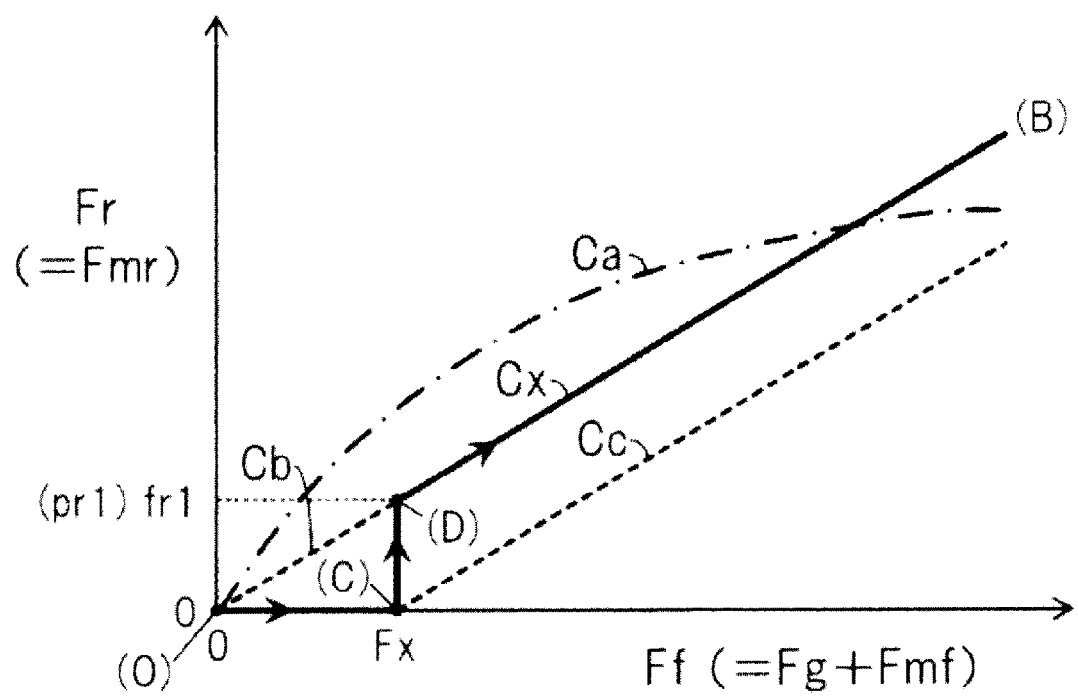
FIG. 3 is an exemplary characteristic graph showing a transition of a braking force in the embodiment.

The front-to-rear distribution of the braking force F in the regenerative cooperation control will be described with reference to a characteristic graph of FIG. 3. The generator GN for regeneration is provided in the front wheel WHf, and in addition to the friction braking force Fmf, the regenerative braking force Fg acts on the front wheel WHf. On the other hand, since the generator GN is not provided in the rear wheel WHr, the regenerative braking force does not act on the rear wheel WHr, and only the friction braking force Fmr acts thereon.

A characteristic Ca illustrated by an alternate long and short dash line represents so-called ideal braking force distribution in which a change in ground contact load (normal force) of each of the front and rear wheels WHf and WHr caused by vehicle deceleration is taken into consideration. In the ideal distribution characteristic Ca, the braking forces Ff and Fr of the front and rear wheels WHf and WHr are proportional to a dynamic ground contact load in which a vehicle deceleration Gx is taken into consideration. Therefore, in the ideal distribution characteristic Ca, when the anti-skid control is not executed, no matter what the coefficient of friction of a road surface is, the front wheel WHf and the rear wheel WHr are wheel locked at the same time, and the braking force F (=Ff+Fr) on the road surface is maximized.

A characteristic Cb (characteristic (O)-(B)) represents an interrelationship between the front wheel braking force Ff and the rear wheel braking force Fr when the regenerative braking force Fg does not act (namely, "Fg=0"). The characteristic Cb is called a "reference characteristic". The reference characteristic Cb is based on the "pressure receiving areas of the front and rear wheel cylinders CWf and CWr", the "effective braking radii of rotary members KTf and KTr", and the "coefficients of friction of friction materials for the front and rear wheels". Here, the slope (namely, "Fr/Ff") of the reference characteristic Cb is "Hr/Hf=Hr/(1−Hr)". Here, a front wheel ratio Hf is the ratio (=Ff/F) of the front wheel braking force Ff to the total braking force F (=Ff+Fr), and the rear wheel ratio Hr is the ratio (=Fr/F) of the rear wheel braking force Fr to the total braking force F.

In general vehicles, the pressure receiving area of the wheel cylinder CW, the effective braking radius of the rotary member KT, and the coefficient of friction of the friction material are set such that the rear wheel WHr is not wheel locked ahead of the front wheel WHf, and the reference characteristic Cb is smaller than the ideal distribution characteristic Ca in the range of normal braking (in a region excluding a region where the maximum braking force is generated). Incidentally, in the region where the maximum braking force is generated, based on the wheel speed Vw, braking force distribution control (so-called EBD control) is executed such that the deceleration slip of the rear wheel WHr is not larger than the deceleration slip of the front wheel WHf.

In the characteristic graph, an origin (O) corresponds to during non-braking (namely, "Ff=Fr=0"). When the operation of the brake operation member BP is started, since "Fd≤Fx" is established in an initial stage of braking, "Fmf=Fmr=0" is determined, and the friction braking forces Fmf and Fmr are not generated. Namely, "Ptf=Ptr=0 (as a result, Pc=Pb=0)" is calculated, and the braking force F is generated only by the regenerative braking force Fg. Since the state is maintained until the required braking force Fd reaches the maximum regenerative force Fx, the operating point of the braking force F is moved from the origin (O) toward a point (C) (point of "Ff=Fx and Fr=0").

When the operation amount Ba of the brake operation member BP is increased, and the regenerative braking force Fg reaches the maximum regenerative force Fx, the required braking force Fd cannot be achieved only by the regenerative braking force Fg. In this case, the front wheel and rear wheel friction braking forces Fmf and Fmr (target values of the friction braking forces) are calculated based on the required braking force Fd and the maximum regenerative force Fx.

Specifically, the rear wheel reference force Fs is calculated by "Fs=Hr×Fd", and the complementary braking force Fh is calculated by "Fh=Fd−Fx". In the case of "Fh≤Fs", "Fmf=0 and Fmr=Fh" are calculated. When the required braking force Fd can be achieved by the regenerative braking force Fg and the rear wheel reference force Fs, only the regenerative braking force Fg (=Fx) acts on the front wheel WHf, and the rear wheel friction braking force Fmr is determined to satisfy the required braking force Fd. At this time, as the vehicle body speed Vx decreases, the maximum regenerative force Fx increases with a characteristic that is "convex downward" (refer to FIG. 2). Since the regenerative braking force Fg (=Fx) slightly increases with respect to an increase in the rear wheel friction braking force Fmr, the operating point of the braking force F makes the transition substantially parallel to a Y-axis from the point (C) (point of "Ff=Fx and Fr=fr1") toward a point (D).

Further, when the brake operation amount Ba is increased, and the complementary braking force Fh cannot be achieved only by the rear wheel reference force Fs (namely, the state of "Fh>Fs"), the front wheel friction braking force Fmf increases from "0" according to the front wheel indicated force Fc. Namely, when the required braking force Fd cannot be achieved by the regenerative braking force Fg and the rear wheel reference force Fs, the front wheel friction braking force Fmf is determined to fill the shortage. The front wheel and rear wheel friction braking forces Fmf and Fmr are calculated by "Fmr=Fs and Fmf=Fh−Fs=Fc" in consideration of the front-to-rear distribution of the braking force F including the regenerative braking force Fg. For this reason, the operating point of the braking force F makes the transition along the characteristic Cb from the point (D) toward a point (B). As described above, a braking force distribution characteristic Cx (transition of the operating point of the braking force F) follows the course of "(O)→(C)→(D)→(B)" as the brake operation amount Ba is increased.

In the brake control device SC, the front wheel target hydraulic pressure Ptf is calculated based on the front wheel friction braking force (target value) Fmf. The second pressure regulating valve UC regulates the second regulated hydraulic pressure Pc based on the front wheel target hydraulic pressure Ptf, and finally, the front wheel brake hydraulic pressure Pwf is controlled. In addition, the rear wheel target hydraulic pressure Ptr is calculated based on the rear wheel friction braking force Fmr. The first pressure regulating valve UB regulates the first regulated hydraulic pressure Pb based on the rear wheel target hydraulic pressure Ptr, and finally, the rear wheel brake hydraulic pressure Pwr is controlled. When a brake operation is started, until the regenerative braking force Fg reaches the maximum regenerative force Fx (the point O to the point C), the hydraulic pressures are controlled to "Pb=Pc=0" based on "Ptf=Ptr=0" (namely, the electric pump DC is driven, but the first and second pressure regulating valves UB and UC are in a fully open state). Then, when the regenerative braking force Fg reaches the maximum regenerative force Fx, the front wheel target hydraulic pressure Ptf is maintained at "0", and the rear wheel target hydraulic pressure Ptr is increased. As a result, in the state of "Pc=0", an increase in the first regulated hydraulic pressure Pb is started, and the rear wheel brake hydraulic pressure Pwr is increased (namely, the second pressure regulating valve UC is in a fully open state). Further, when the complementary braking force Fh exceeds the rear wheel reference force Fs (corresponding to the point D, and when the rear wheel brake hydraulic pressure Pwr reaches a hydraulic pressure pr1 corresponding to a predetermined braking force fr1), the front wheel target hydraulic pressure Ptf is increased from "0". As a result, an increase in the second regulated hydraulic pressure Pc (namely, the front wheel brake hydraulic pressure Pwf) is started. Thereafter, the front and rear wheel target hydraulic pressures Ptf and Ptr are increased, and the first and second regulated hydraulic pressures Pb and Pc are increased in consideration of a front-to-rear ratio (for example, the rear wheel ratio Hr) such that the operating point of the braking force F makes the transition along the reference characteristic Cb.

For example, in a configuration where the same hydraulic pressure is always introduced to all the wheel cylinders CW (namely, when the first regulated hydraulic pressure Pb and the second regulated hydraulic pressure Pc are the same), the braking force distribution in the regenerative cooperation control changes according to a characteristic Cc. The rear wheel braking force Fr in the characteristic Cc is smaller than the rear wheel braking force Fr of the ideal distribution characteristic Ca. For this reason, in the characteristic Cc, the vehicle stability is secured, but the rear wheel braking force Fr cannot be fully utilized. In the brake control device SC, the front wheel and rear wheel friction braking forces (target values) Fmf and Fmr are calculated in consideration of a predetermined rear wheel ratio Hr, and the regulated hydraulic pressures Pc and Pb (namely, the brake hydraulic pressures Pwf and Pwr) are regulated independently and separately from the brake operation (or request for braking) to achieve the calculated front wheel and rear wheel friction braking forces Fmf and Fmr. According to the distribution characteristic Cx, the regenerative amount Rg of the generator GN can be maximized, and the front-to-rear distribution of the braking force F can be optimized. Namely, the braking forces Ff and Fr of the front and rear wheels can be suitably secured, the vehicle stability can be maintained, and a sufficient amount of regenerable energy can be secured.

[Configuration of Brake Operation Unit]

Figure 4:
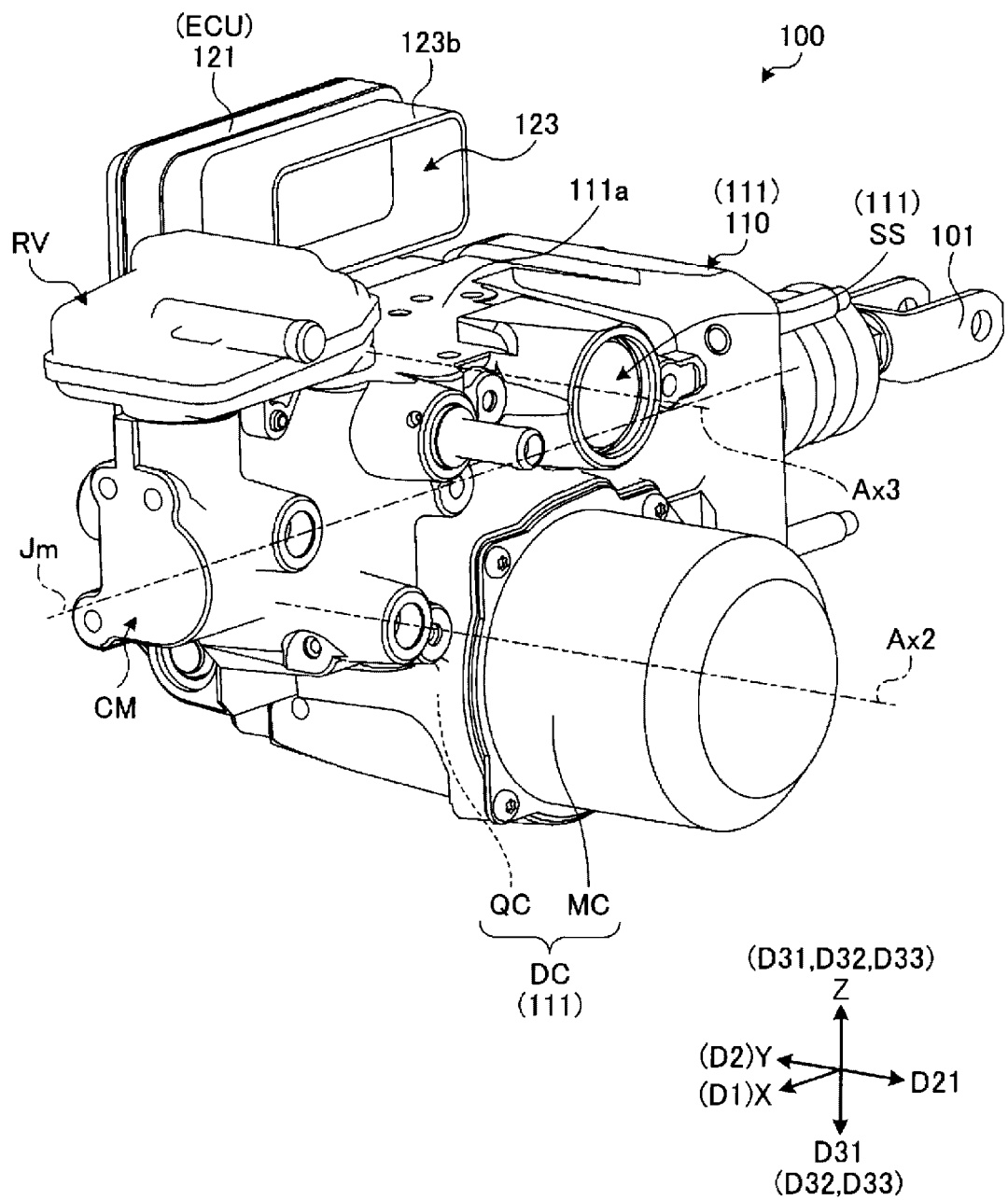
FIG. 4 is a schematic and exemplary perspective view of the brake operation unit of the embodiment.
Figure 5:
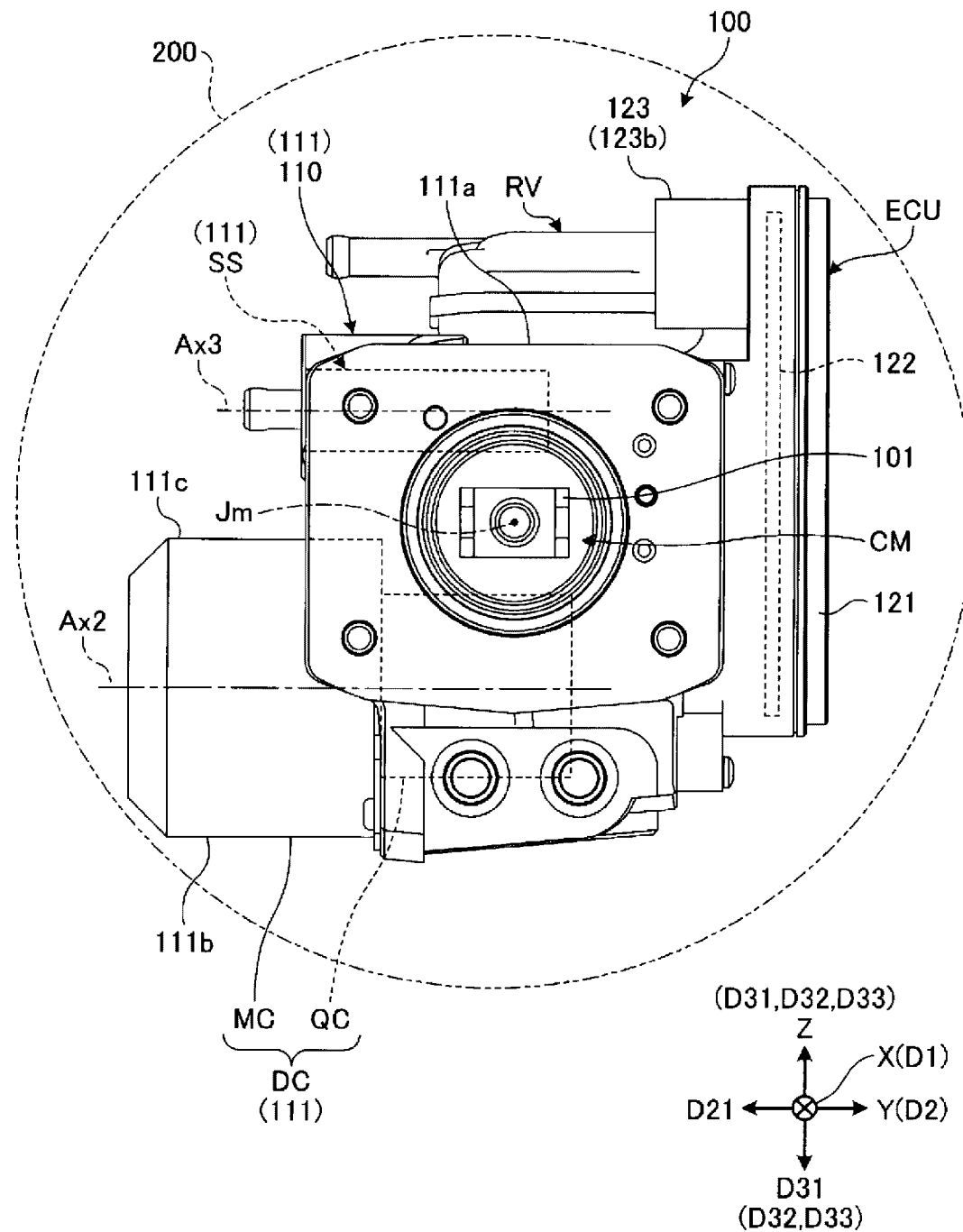
FIG. 5 is a schematic and exemplary rear view of the brake operation unit of the embodiment.
Figure 6:
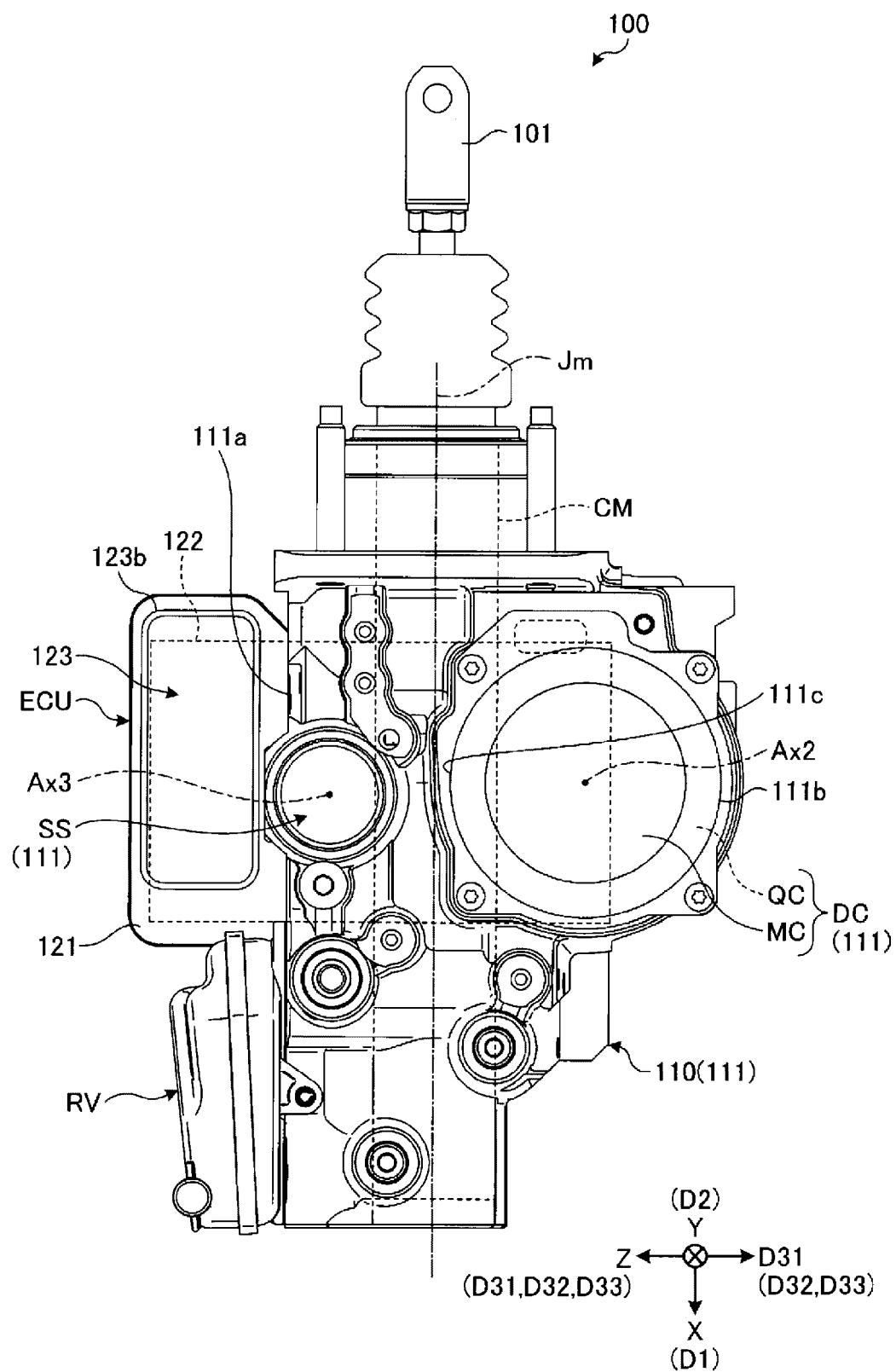
FIG. 6 is a schematic and exemplary side view of the brake operation unit of the embodiment.
Figure 7:
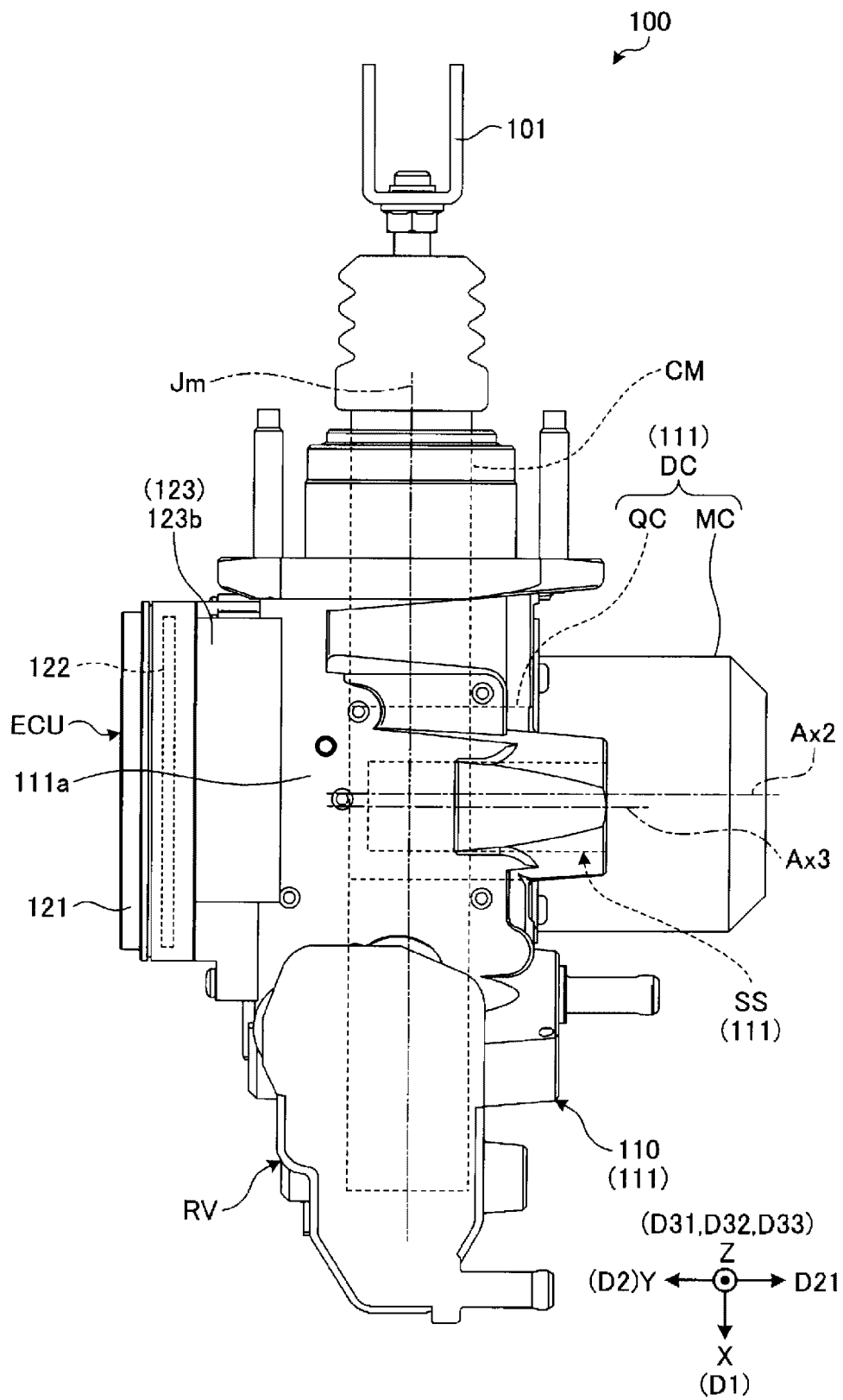
FIG. 7 is a schematic and exemplary plan view of the brake operation unit of the embodiment.
Figure 8:
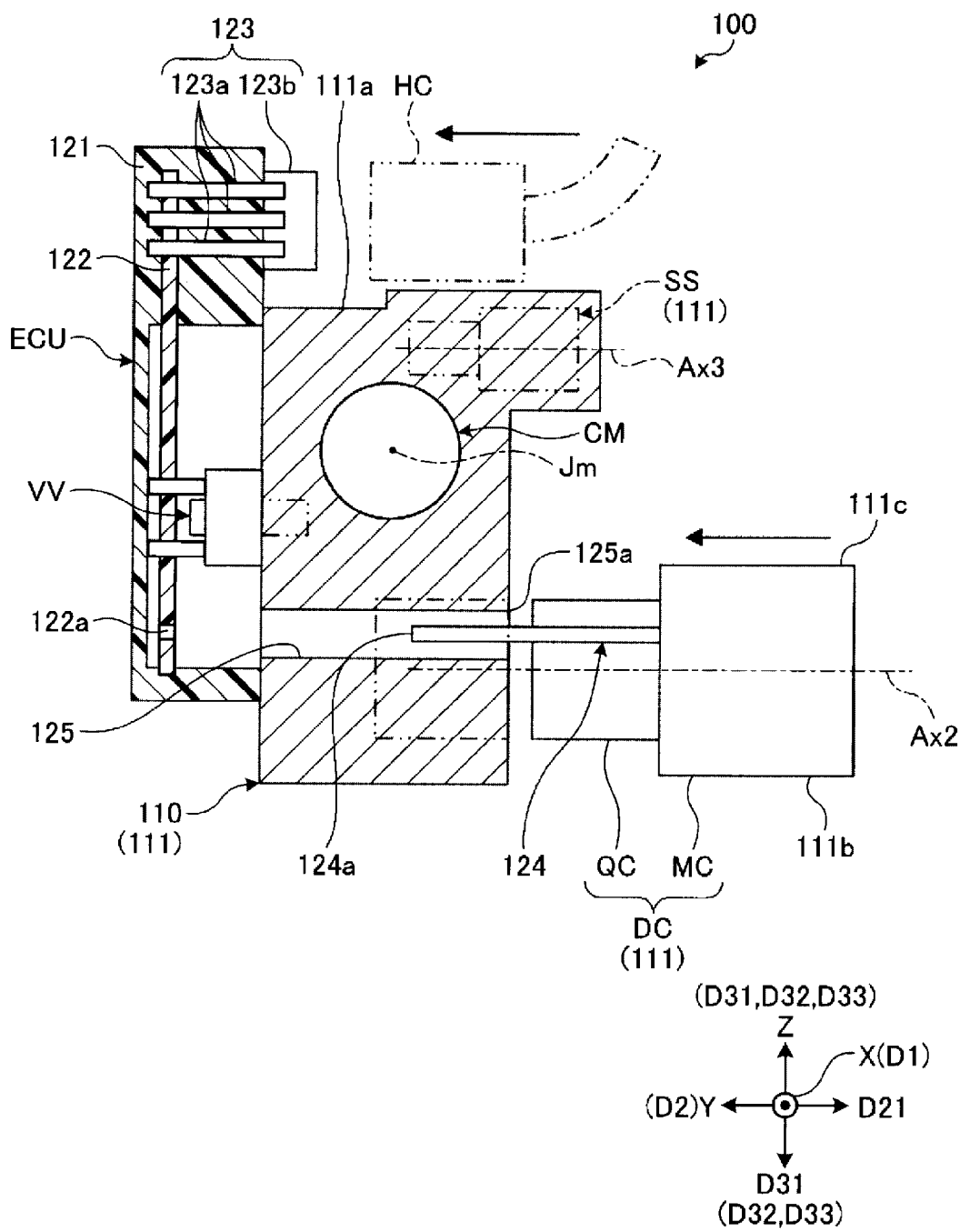
FIG. 8 is a schematic and exemplary cross-sectional view orthogonal to a first central axis of a master cylinder of the brake operation unit of the embodiment.

FIG. 4 is a perspective view of a brake operation unit 100, FIG. 5 is a rear view of the brake operation unit 100, FIG. 6 is a side view of the brake operation unit 100, FIG. 7 is a plan view of the brake operation unit 100, and FIG. 8 is a cross-sectional view orthogonal to the central axis Jm of the brake operation unit 100. In FIGS. 4 to 8, arrows indicating directions in a state where the brake operation unit 100 is mounted in the vehicle are illustrated. A direction X indicates the front of the vehicle, a direction Y indicates the right in a vehicle width direction, and a direction Z indicates an upper side of the vehicle. Incidentally, in the following description, unless otherwise specified, all the front, the rear, a forward and rearward direction, the right, the left, an upper side, a lower side, and an upward and downward direction indicate directions in the vehicle. The right and the left are the right and the left in a state where the vehicle faces forward. In addition, in the following description, "intersection" does not necessarily mean being orthogonal, and also includes being substantially orthogonal and a state where there is a feasible obtuse or acute angle difference.

As illustrated in FIG. 4, the brake operation unit 100 includes a housing 110. The housing 110 is made of, for example, a metallic material such as an aluminum alloy. Components such as the master cylinder CM, the electric pump DC, the stroke simulator SS, the upper portion controller ECU, and the reservoir RV are fixed to the housing 110. The components are fixed to the housing 110 or are attached to an outer side of the housing 110 in a state where at least parts thereof are housed in holes provided in the housing 110. A passage (not illustrated) for the working fluid is provided in the housing 110, and the components are connected to each other by the passage, so that a hydraulic circuit (fluid circuit) is formed. The housing 110 may also be referred to as a body or a block.

The central axis Jm of the master cylinder CM passes through substantially the center of the housing 110, and extends in the forward and rearward direction (direction X). Namely, the master cylinder CM extends in the forward and rearward direction. A connection portion 101 connected to the brake operation member BP (refer to FIG. 1) protrudes rearward from a rear end of the master cylinder CM. The operating force of the brake operation member BP is transmitted to the input piston PK (refer to FIG. 1) via the connection portion 101, and the master piston PM moves in connection with the operation of the brake operation member BP. The brake operation member BP is one example of an operation member, the input piston PK and the master piston PM are one example of a piston, and the central axis Jm of the master cylinder CM is one example of a first central axis.

As described above, the electric pump DC includes the electric motor MC and the fluid pump QC. As illustrated in FIGS. 4 and 5, the electric pump DC is located below the master cylinder CM. A central axis Ax2 as the center of rotation of a rotor (not illustrated) of the electric motor MC and the central axis Jm of the master cylinder CM are in a skew position. In other words, the central axis Ax2 of the electric motor MC is separated downward from the central axis Jm of the master cylinder CM, and intersects a direction D1 parallel to the central axis Jm of the master cylinder CM. In the present embodiment, as one example, in a vehicle-mounted state, the direction D1 is the front, and the central axis Ax2 is orthogonal to the direction D1 to extend in the vehicle width direction. The central axis Ax2 is one example of a second central axis. The direction D1 is one example of a direction parallel to the first central axis.

The fluid pump QC is housed in the housing 110, and the electric motor MC is exposed outside the housing 110; however, the electric pump DC is not limited to such a form. In addition, the fluid pump QC is, for example, a gear pump, but is not limited thereto, and may be a single cylinder piston pump (piston cylinder), pumps of other forms, or a discharging mechanism that discharges the working fluid. For example, the electric pump DC may be configured such that a linear motion member of a rotation-to-linear motion conversion mechanism moves a piston in a cylinder of the fluid pump QC according to the rotation of the rotor of the electric motor MC, thereby expanding and contracting a fluid chamber to suction and discharge the working fluid. In addition, the electric pump DC may be entirely housed in the housing 110, or the electric pump DC may be entirely attached to the outer side of the housing 110 to be integrated with the housing 110. The electric pump DC is one example of an electric discharging unit, the electric motor MC is one example of a motor, and the fluid pump QC is one example of a discharging mechanism that is caused to discharge the working fluid by operation of the electric motor MC.

The stroke simulator SS is located above the master cylinder CM. A central axis Ax3 of the stroke simulator SS and the central axis Jm of the master cylinder CM are in a skew position. In other words, the central axis Ax3 of the stroke simulator SS is separated upward from the central axis Jm of the master cylinder CM, and intersects the direction D1 parallel to the central axis Jm of the master cylinder CM. In the present embodiment, as one example, in a vehicle-mounted state, the central axis Ax3 is orthogonal to the direction D1 to extend in the vehicle width direction. Therefore, the central axis Ax2 of the electric motor MC and the central axis Ax3 of the stroke simulator SS are parallel to each other. In addition, as illustrated in FIG. 6, when viewed in a direction D2 parallel to the central axis Ax2 of the electric motor MC, the central axis Jm of the master cylinder CM is located between the central axis Ax2 of the electric motor MC and the stroke simulator SS (the central axis Ax3 thereof). The stroke simulator SS is one example of a reaction force applying mechanism. The central axis Ax3 is one example of a third central axis. The direction D2 is one example of a direction parallel to the second central axis. In addition, in the present embodiment, as one example, in a vehicle-mounted state, the direction D2 is the vehicle width direction.

Incidentally, the stroke simulator SS is housed in the housing 110, but is not limited to such a form. Apart of the stroke simulator SS may be housed in the housing 110, or the stroke simulator SS may be entirely attached to the outer side of the housing 110 to be integrated with the housing 110. In addition, in the present embodiment, in a vehicle-mounted state, the electric motor MC is located below the central axis Jm of the master cylinder CM, and the stroke simulator SS is located above the central axis Jm of the master cylinder CM; however, the present disclosure is not limited to such a disposition, and the electric motor MC may be located above the central axis Jm of the master cylinder CM, and the stroke simulator SS may be located below the central axis Jm of the master cylinder CM.

As illustrated in FIGS. 4 and 5, the upper portion controller ECU includes a case 121 having a flat rectangular parallelepiped shape. A circuit substrate 122 is housed in the case 121. Electronic components such as a micro processor unit (MPU), a switching element, and a capacitor are mounted on the circuit substrate 122. As illustrated in FIG. 5, the case 121 and the circuit substrate 122 are separated from the master cylinder CM (the central axis Jm thereof) to a side opposite to the electric motor MC with respect to the master cylinder CM (the central axis Jm thereof). The upper portion controller ECU is one example of a control unit.

As illustrated in FIGS. 5 and 6, the circuit substrate 122 is disposed in a posture where the circuit substrate 122 intersects the direction D2 parallel to the central axis Ax2 of the electric motor MC.

The circuit substrate 122 is separated from the central axis Jm of the master cylinder CM in the vehicle width direction, and when viewed from the line of sight of FIG. 5, in other words, when viewed in the direction D1 parallel to the central axis Jm of the master cylinder CM, the circuit substrate 122 extends in a direction D32 intersecting the central axis Ax2 of the electric motor MC. In the present embodiment, as one example, in a vehicle-mounted state, the central axis Ax2 of the electric motor MC extends in the vehicle width direction, and the direction D32 is the upward and downward direction orthogonal to the vehicle width direction. In addition, the circuit substrate 122 is orthogonal to the direction D2 to extend in the upward and downward direction and in the forward and rearward direction.

In addition, when viewed from the line of sight of FIG. 5, in other words, when viewed in a direction parallel to the central axis Jm of the master cylinder CM, the central axis Ax2 of the electric motor MC and the circuit substrate 122 are located to be offset from the electric pump DC and the stroke simulator SS in the direction D2. In the present embodiment, as one example, in a vehicle-mounted state, the direction D2 is the vehicle width direction, and when viewed from the line of sight of FIG. 5, the electric pump DC and the stroke simulator SS, and the circuit substrate 122 are offset from each other in the vehicle width direction. Incidentally, as illustrated in FIG. 6, the electric pump DC and the stroke simulator SS, and the circuit substrate 122 overlap each other with an interval therebetween in the vehicle width direction, and the electric pump DC and the stroke simulator SS overlap each other (are lined up) with an interval therebetween in the upward and downward direction.

In addition, when viewed from the line of sight of FIG. 7, in other words, when viewed in a direction D31 orthogonal to the central axis Jm of the master cylinder CM and the central axis Ax2 of the electric motor MC, the central axis Jm of the master cylinder CM is located between the circuit substrate 122 and the electric motor MC. In the present embodiment, as one example, in a vehicle-mounted state, the direction D31 is the upward and downward direction. Incidentally, in FIGS. 7 and 5, the circuit substrate 122, and the electric pump DC and the stroke simulator SS may be disposed to be laterally reversed with respect to the central axis Jm of the master cylinder CM.

As illustrated in FIGS. 4 to 8, the upper portion controller ECU includes a connector 123. A harness connector HC (refer to FIG. 8) is attached to and detached from the connector 123. The harness connector HC includes a plurality of wirings (not illustrated) such as wirings that supply power or wirings that transmit and receive signals.

As illustrated in FIG. 8, the connector 123 includes a connector terminal 123*a* and a connector cover 123*b*. The connector terminal 123*a* is made of a conductive material such as a copper alloy. The connector terminal 123*a* is fixed to the circuit substrate 122 in a state where the connector terminal 123*a* is electrically connected to a wiring pattern (conductor) of the circuit substrate 122, and is electrically connected to a conductor in the harness connector HC in a state where the harness connector HC is attached to the connector 123. The connector cover 123*b* is made of an insulating material, and is integrated with the case 121. Namely, the connector cover 123*b* is a part of the case 121.

When viewed from the line of sight of FIG. 5, in other words, when viewed in the direction D1 parallel to the central axis Jm of the master cylinder CM, the connector 123 and the connector terminal 123a are located further away from the central axis Jm of the master cylinder CM than an end portion 111a of a first portion 111 in the direction D32 that is a direction in which the circuit substrate 122 extends and which intersects the central axis Ax2 of the electric motor MC, the first portion 111 including the housing 110, the electric pump DC, and the stroke simulator SS. In the present embodiment, as one example, in a vehicle-mounted state, the direction D1 is the forward and rearward direction, the central axis Ax2 of the electric motor MC extends in the vehicle width direction, the direction D32 is the upward and downward direction orthogonal to the central axis Ax2 of the electric motor MC, and the end portion 111a is an end portion (upper end) of the housing 110. The end portion 111a is one example of a first end portion. Incidentally, the end portion 111a of the first portion 111 may be an end portion of the stroke simulator SS, or may be an end portion of the electric pump DC. The first portion 111 is a part of the brake operation unit 100.

In addition, as illustrated in FIG. 8, the connector terminal 123a protrudes from the circuit substrate 122 in a direction D21 to be close to the central axis Jm of the master cylinder CM in the direction D21 intersecting the circuit substrate 122. In the present embodiment, as one example, in a vehicle-mounted state, the direction D21 is the vehicle width direction and is orthogonal to the circuit substrate 122, and the connector terminal 123a protrudes from the circuit substrate 122 to the right in FIG. 8. With such a configuration, the harness connector HC moves along the end portion 111a in the vehicle width direction to be attached to and detached from the connector 123 on a side farther from the central axis Jm of the master cylinder CM than the end portion 111a of the first portion 111.

When viewed from the line of sight of FIG. 6, in other words, when viewed in the direction D2 parallel to the central axis Ax2 of the electric motor MC, the reservoir RV is located to be offset with respect to the connector 123 in the direction D1 parallel to the central axis Jm of the master cylinder CM. In the present embodiment, as one example, in a vehicle-mounted state, the direction D1 is the forward and rearward direction, and the reservoir RV is located to be offset forward with respect to the connector 123. The reservoir RV is one example of a tank. The reservoir RV may be a sub-tank connected to a main tank, which is provided in a position away from the brake operation unit 100, via a tube, a hose, or the like. Incidentally, the reservoir RV and the connector 123 may be disposed to be reversed in the forward and rearward direction.

A bus bar 124 illustrated in FIG. 8 electrically connects the electric motor MC (conductor thereof) and the circuit substrate 122 (conductor thereof) to supply electric power to the electric motor MC. The bus bar 124 is provided in the electric pump DC in the state before the electric pump DC is assembled, but is not limited thereto, and may be provided in the circuit substrate 122. The bus bar 124 is one example of a conductor, and may also be referred to as a pin.

In an assembled state, when viewed from the line of sight of FIG. 8, in other words, when viewed in the direction D1 parallel to the central axis Jm of the master cylinder CM, the bus bar 124 is located closer to the central axis Jm of the master cylinder CM than an end portion 111b of two end portions 111b and 111c of the electric motor MC in a direction D33 orthogonal to the central axis Ax2, the end portion 111b being away from the central axis Jm of the master cylinder CM. In the present embodiment, as one example, in a vehicle-mounted state, the central axis Ax2 of the electric motor MC extends in the vehicle width direction, and the direction D33 is the upward and downward direction. In addition, the end portion 111b is a lower end of the electric motor MC. The end portion 111b is one example of a second end portion.

In addition, the bus bar 124 extends parallel to the central axis Ax2 of the electric motor MC, and penetrates through an opening 125 that is provided in the housing 110 and extends to intersect the circuit substrate 122. In the present embodiment, as one example, in a vehicle-mounted state, the bus bar 124 and the opening 125 extend in the vehicle width direction, and are orthogonal to the circuit substrate 122. The opening 125 is, for example, a through-hole, and may also be referred to as a passage of the bus bar 124. An insulator may intervene between an inner surface of the opening 125 and the bus bar 124. In addition, the opening 125 may be formed of a cutout (recessed groove) and a lid covering the cutout.

When the electric pump DC is assembled to the housing 110, the bus bar 124 is inserted into the opening 125, and an end portion 124a of the bus bar 124 is inserted into an attachment hole 122a of the circuit substrate 122, and then is electrically connected to a conductor around the attachment hole 122a, for example, by soldering. As can be seen from FIG. 8, the bus bar 124 is covered with the housing 110, and the end portion 124a of the bus bar 124 is covered with the case 121 of the upper portion controller ECU. In addition, an opening end 125a on an opposite side of the opening 125 from the ECU is covered with the electric motor MC. Namely, a root portion of the bus bar 124 is covered with the housing 110 and the electric motor MC.

In addition, a plurality of electromagnetic valves VV are provided at a boundary of the housing 110, which is adjoined to the case 121. However, FIG. 8 illustrates only one electromagnetic valve VV. The electromagnetic valves VV are the electromagnetic valves VA, VB, UB, and UC (refer to FIG. 1). The operation of the electromagnetic valves VV is controlled by the upper portion controller ECU.

As described above, in the present embodiment, as illustrated in FIG. 5, the central axis Ax2 (second central axis) of the electric motor MC (motor) is separated from the central axis Jm (first central axis) of the master cylinder CM, and intersects the direction D1 parallel to the central axis Jm of the master cylinder CM. In addition, when viewed from the line of sight of FIG. 6, in other words, when viewed in the direction parallel to the central axis Ax2 of the electric motor MC, the central axis Jm of the master cylinder CM is located between the central axis Ax2 of the electric motor MC and the stroke simulator SS (reaction force applying mechanism). According to such a configuration, the electric pump DC and the stroke simulator SS can be disposed more compactly around the master cylinder CM. Accordingly, the size of the brake operation unit 100 can be suppressed from being increased in a radial direction of the central axis Jm of the master cylinder CM.

In addition, in the present embodiment, for example, as illustrated in FIG. 5, the circuit substrate 122 is disposed in a posture where the circuit substrate 122 intersects the direction D2 parallel to the central axis Ax2 (second central axis) of the electric motor MC (motor). In addition, when viewed from the line of sight of FIG. 5, in other words, when viewed in the direction D1 parallel to the central axis Jm (first central axis) of the master cylinder CM, the circuit substrate 122 is located to be offset from the electric pump DC (electric discharging unit) and the stroke simulator SS (reaction force applying mechanism) in the direction D2 parallel to the central axis Ax2 of the electric motor MC.

Further, when viewed from the line of sight of FIG. 7, in other words, when viewed in the direction D31 orthogonal to the central axis Jm of the master cylinder CM and the central axis Ax2 of the electric motor MC, the central axis Jm of the master cylinder CM is located between the circuit substrate 122 and the electric motor MC. According to such a configuration, for example, the circuit substrate 122, and the electric pump DC and the stroke simulator SS can be separately disposed on both sides of the central axis Jm of the master cylinder CM. Therefore, the size of the brake operation unit 100 can be suppressed from being increased in the radial direction of the central axis Jm of the master cylinder CM.

In addition, when a specification in which the brake operation unit 100 is mounted and a specification in which a vacuum booster 200 is mounted are set as lineups of the vehicle, it is preferable that when viewed in the direction D1 parallel to the central axis Jm (first central axis) of the master cylinder CM, namely, when viewed from the line of sight of FIG. 5, the brake operation unit 100 fits inside the outer shape of the vacuum booster 200. Accordingly, for example, in vehicle design, the time and effort required to review the layout of components for each specification can be reduced, and the specification in which the brake operation unit 100 is mounted and the specification in which the vacuum booster 200 is mounted can be more easily set as the lineups of the vehicle.

In addition, in the present embodiment, for example, when viewed from the line of sight of FIG. 5, in other words, when viewed in the direction D1 parallel to the central axis Jm (first central axis) of the master cylinder CM, the connector 123 is located further away from the central axis Jm of the master cylinder CM than the end portion 111a (first end portion) of the first portion 111 in the direction D32 that is a direction in which the circuit substrate 122 extends and which intersects the central axis Ax2 (second central axis) of the electric motor MC (motor), the first portion 111 including the housing 110, the electric pump DC (electric discharging unit), and the stroke simulator SS (reaction force applying mechanism). According to such a configuration, for example, when the brake operation unit 100 is mounted in the vehicle in a posture where the circuit substrate 122 is disposed along the upward and downward direction, a worker or a robot can more easily execute work of attaching and detaching the connector 123 and the harness connector HC to and from each other on a side above the end portion 111a of the first portion 111 while avoiding interference with the first portion 111 or other components.

In addition, in the present embodiment, for example, when viewed from the line of sight of FIG. 6, in other words, when viewed in the direction D2 parallel to the central axis Ax2 (second central axis) of the electric motor MC (motor), the reservoir RV (tank) is located to be offset from the connector 123 in the direction D1 parallel to the central axis Jm (first central axis) of the master cylinder CM. According to such a configuration, for example, when compared to a configuration where the connector 123 and the reservoir RV are disposed to overlap each other in the direction D1, the size of the brake operation unit 100 can be further suppressed from being increased in the radial direction of the central axis Jm of the master cylinder CM.

In addition, in the present embodiment, for example, when viewed from the line of sight of FIG. 8, in other words, when viewed in the direction D1 parallel to the central axis Jm (first central axis) of the master cylinder CM, the bus bar 124 (conductor) is located closer to the central axis Jm of the master cylinder CM than the end portion 111b (second end portion) of the two end portions 111b and 111c of the electric motor MC in the direction D33 orthogonal to the central axis Ax2 (second central axis) of the electric motor MC (motor), the end portion 111b being away from the central axis Jm of the master cylinder CM. According to such a configuration, for example, when compared to a case where the bus bar 124 is located farther from the central axis Jm of the master cylinder CM than the end portion 111b of the electric motor MC, the size of the brake operation unit 100 can be further suppressed from being increased in the radial direction of the central axis Jm of the master cylinder CM.

In addition, in the present embodiment, for example, the bus bar 124 (conductor) extends parallel to the central axis Ax2 (second central axis) of the electric motor MC (motor). According to such a configuration, for example, when the electric pump DC (electric discharging unit) is assembled to the housing 110, the worker or the robot can relatively easily bring the bus bar 124 and the circuit substrate 122 or the electric pump DC close to each other, and more easily or more quickly execute work of electrical connection between the circuit substrate 122 and the electric motor MC.

The embodiment of the present disclosure has been provided above as an example, and the embodiment is one example, and is not intended to limit the scope of the disclosure. The embodiment can be implemented in other various forms, and various omissions, replacements, combinations, and changes can be made thereto without departing from the concept of the disclosure. In addition, specifications (structure, type, direction, form, size, length, width, thickness, height, number, disposition, position, material, and the like) such as each configuration or shape can be appropriately changed and implemented.

The invention claimed is:

1. A brake operation unit comprising:
    a master cylinder that movably houses a piston moving in connection with an operation member;
    an electric discharging unit including a motor and a discharging mechanism that is caused to discharge a working fluid by operation of the motor; and
    a stroke simulator that is a reaction force applying mechanism which applies a reaction force to the operation member,
    wherein a second central axis of the motor is separated from a first central axis of the master cylinder, and intersects a plane parallel to the first central axis,
    a central axis of the stroke simulator is separated from the first central axis, and
    when viewed in a direction parallel to the second central axis, the first central axis is located between the second central axis and the central axis of the stroke simulator.

2. The brake operation unit according to claim 1, further comprising:
    a control unit that controls the electric discharging unit,
    wherein a circuit substrate of the control unit is postured to intersect the direction parallel to the second central axis, and is located to be offset from the electric discharging unit and the reaction force applying mechanism in the direction parallel to the second central axis when viewed in the direction parallel to the first central axis, and
    when viewed in a direction orthogonal to the first central axis and the second central axis, the first central axis is located between the circuit substrate and the motor.

3. The brake operation unit according to claim 2, further comprising:

a housing in which or to which the master cylinder, the electric discharging unit, the reaction force applying mechanism, and the control unit are housed or attached, wherein the circuit substrate is separated from the first central axis, and extends in a direction intersecting the second central axis when viewed in the direction parallel to the first central axis, and the control unit includes a connector that is located further away from the first central axis than a first end portion of a first portion in the direction in which the circuit substrate extends and which intersects the second central axis, when viewed in the direction parallel to the first central axis, the first portion including the housing, the electric discharging unit, and the reaction force applying mechanism.

4. The brake operation unit according to claim 3, further comprising:

a tank for the working fluid, which is located to be offset from the connector in the direction parallel to the first central axis when viewed in the direction parallel to the second central axis.

5. The brake operation unit according to claim 4, further comprising:

a conductor that is located closer to the first central axis than a second end portion of two end portions of the motor in the direction orthogonal to the second central axis when viewed in the direction parallel to the first central axis, to electrically connect the motor and the circuit substrate, the second end portion being far from the first central axis.

6. The brake operation unit according to claim 5, wherein the conductor extends parallel to the second central axis.

7. The brake operation unit according to claim 2, further comprising:

a conductor that is located closer to the first central axis than a second end portion of two end portions of the motor in the direction orthogonal to the second central axis when viewed in the direction parallel to the first central axis, to electrically connect the motor and the circuit substrate, the second end portion being far from the first central axis.

8. The brake operation unit according to claim 7, wherein the conductor extends parallel to the second central axis.

9. The brake operation unit according to claim 3, further comprising:

a conductor that is located closer to the first central axis than a second end portion of two end portions of the motor in the direction orthogonal to the second central axis when viewed in the direction parallel to the first central axis, to electrically connect the motor and the circuit substrate, the second end portion being far from the first central axis.

10. The brake operation unit according to claim 9, wherein the conductor extends parallel to the second central axis.

11. A brake operation unit comprising:

a master cylinder that movably houses a piston moving in connection with an operation member;

an electric discharging unit including a motor and a discharging mechanism that is caused to discharge a working fluid by operation of the motor;

a control unit that controls the electric discharging unit; and a reaction force applying mechanism that applies a reaction force to the operation member, wherein a second central axis of the motor is separated from a first central axis of the master cylinder, and intersects a plane parallel to the first central axis, when viewed in a direction parallel to the second central axis, the first central axis is located between the second central axis and the reaction force applying mechanism, a circuit substrate of the control unit is postured to intersect the direction parallel to the second central axis, and is located to be offset from the electric discharging unit and the reaction force applying mechanism in the direction parallel to the second central axis when viewed in the direction parallel to the first central axis, and when viewed in a direction orthogonal to the first central axis and the second central axis, the first central axis is located between the circuit substrate and the motor.

12. The brake operation unit according to claim 11, further comprising:

a housing in which or to which the master cylinder, the electric discharging unit, the reaction force applying mechanism, and the control unit are housed or attached, wherein the circuit substrate is separated from the first central axis, and extends in a direction intersecting the second central axis when viewed in the direction parallel to the first central axis, and the control unit includes a connector that is located further away from the first central axis than a first end portion of a first portion in the direction in which the circuit substrate extends and which intersects the second central axis, when viewed in the direction parallel to the first central axis, the first portion including the housing, the electric discharging unit, and the reaction force applying mechanism.

13. The brake operation unit according to claim 12, further comprising:

a tank for the working fluid, which is located to be offset from the connector in the direction parallel to the first central axis when viewed in the direction parallel to the second central axis.

14. The brake operation unit according to claim 13, further comprising:

a conductor that is located closer to the first central axis than a second end portion of two end portions of the motor in the direction orthogonal to the second central axis when viewed in the direction parallel to the first central axis, to electrically connect the motor and the circuit substrate, the second end portion being far from the first central axis.

15. The brake operation unit according to claim 14, wherein the conductor extends parallel to the second central axis.

16. The brake operation unit according to claim 13, wherein the conductor extends parallel to the second central axis.

17. The brake operation unit according to claim 12, further comprising:

a conductor that is located closer to the first central axis than a second end portion of two end portions of the motor in the direction orthogonal to the second central axis when viewed in the direction parallel to the first central axis, to electrically connect the motor and the circuit substrate, the second end portion being far from the first central axis.

18. The brake operation unit according to claim 17, wherein the conductor extends parallel to the second central axis.

19. The brake operation unit according to claim 11, further comprising:
a conductor that is located closer to the first central axis than a second end portion of two end portions of the motor in the direction orthogonal to the second central axis when viewed in the direction parallel to the first central axis, to electrically connect the motor and the circuit substrate, the second end portion being far from the first central axis.

20. The brake operation unit according to claim 19, wherein the conductor extends parallel to the second central axis.

* * * * *